US008545608B2

(12) United States Patent
Sawada et al.

(10) Patent No.: US 8,545,608 B2
(45) Date of Patent: Oct. 1, 2013

(54) SILICATE MATERIALS, METHOD FOR THEIR MANUFACTURE, AND METHOD FOR USING SUCH SILICATE MATERIALS FOR ADSORPTIVE FLUID SEPARATIONS

(75) Inventors: James A. Sawada, Vancouver (CA); Edward J. Rode, Surrey (CA); Steven M. Kuznicki, Edmonton (CA); Christopher Chih Itao Lin, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 0 days.

(21) Appl. No.: 13/327,331

(22) Filed: Dec. 15, 2011

(65) Prior Publication Data
US 2013/0014644 A1 Jan. 17, 2013

Related U.S. Application Data

(63) Continuation of application No. 12/308,550, filed as application No. PCT/US2007/014523 on Jun. 22, 2007, now abandoned.

(60) Provisional application No. 60/817,536, filed on Jun. 28, 2006.

(51) Int. Cl.
*B01D 53/02* (2006.01)

(52) U.S. Cl.
USPC ...... 96/108; 95/90; 95/96; 423/700; 423/718; 502/60; 502/64; 502/67; 502/68

(58) Field of Classification Search
USPC ............... 95/90, 96; 423/700, 718; 502/60, 502/64, 67, 68
See application file for complete search history.

(56) References Cited

U.S. PATENT DOCUMENTS

| 2,882,243 | A | 4/1959 | Milton |
|---|---|---|---|
| 2,882,244 | A | 4/1959 | Milton |
| 3,329,481 | A | 7/1967 | Young et al. |
| 4,280,305 | A | 7/1981 | Logsdon |
| 4,410,501 | A | 10/1983 | Taramasso et al. |
| 4,524,055 | A | 6/1985 | Onodera et al. |
| 4,603,040 | A | 7/1986 | Kuznicki et al. |
| 4,606,899 | A | 8/1986 | Butter et al. |
| 4,853,202 | A | 8/1989 | Kuznicki |
| 4,938,939 | A | 7/1990 | Kuznicki |
| 4,994,191 | A | 2/1991 | Kuznicki et al. |
| 5,208,006 | A | 5/1993 | Kuznicki et al. |
| 5,244,650 | A | 9/1993 | Kuznicki et al. |
| 5,374,747 | A | 12/1994 | Saxton et al. |
| 5,989,316 | A | 11/1999 | Kuznicki et al. |
| 6,068,682 | A | 5/2000 | Kuznicki et al. |
| 6,129,846 | A | 10/2000 | Gadkaree |
| 6,387,159 | B1 | 5/2002 | Butwell et al. |
| 6,610,124 | B1 | 8/2003 | Dolan et al. |
| 6,632,767 | B2 | 10/2003 | Huo et al. |
| 2003/0049200 | A1 | 3/2003 | Kuznicki et al. |
| 2006/0229466 | A1 | 10/2006 | Arhancet et al. |
| 2008/0092737 | A1 | 4/2008 | Storbo et al. |

FOREIGN PATENT DOCUMENTS

| EP | 0 068 796 A1 | 1/1983 |
|---|---|---|
| EP | 0 121 232 A2 | 10/1984 |
| WO | 85/04855 A1 | 11/1985 |
| WO | 85/04856 A1 | 11/1985 |
| WO | WO 99/32404 | 7/1999 |

OTHER PUBLICATIONS

Lin, "Synthesis and Structural Characterization of Microporous Umbite, Penkvilksite, and Other Titanosilicates," *J. Phys. Chem.* B 101:7114-7120, May 30, 1997.
International Search Report dated Jan. 18, 2008 in International Application No. PCT/US2007/014523, 3 pages.
Written Opinion of International Searching Authority dated Jan. 18, 2008 in International Application No. PCT/US2007/014523, 4 pages.
STIC Search titled "U.S. Appl. No. 12/308,550" dated Mar. 7, 2011.
D.W. Breck, Zeolite Molecular Sieves, 1974, Chapter 2.
E.M. Flanigan et al, Aluminophosphate Molecular Sieves: A New Class of Microporous Crystalline Inorganic Solids, J. Am. Chem Soc. 1982, 104, pp. 1146-1147.
E.M. Flanigan et al, Aluminophosphate Molecular Sieves and the Periodic Table, Proceedings of the 7th International Zeolite Conference 1986, pp. 103-112.
M. Taramasso et al, Moledular Sieve Borosilicates, Proceedings of the 5th International Zeolite Conference 1980, pp. 40-48.
W.J. Ball et al, The Synthesis and Characterisation of Iron Silicate Molecular Sieves Sieves, Proceedings of the 7th International Zeolite Conference 1986, pp. 137-144.
D.W. Break, Zeolite Molecular Sieves 1974, The Synthetic Zeolites, p. 322.

(Continued)

*Primary Examiner* — Christopher P Jones
(74) *Attorney, Agent, or Firm* — Eric J. Schaal

(57) ABSTRACT

Embodiments of crystalline, titanium silicate molecular sieves are described having a formula representing mole ratios of oxides of $n\text{M}_1\text{O}:\text{TiO}_2:y\text{SiO}_2:z\text{H}_2\text{O}:w\text{X}$ where $M_1$ refers to a metal cation or mixture of metal cations; n is from about 1 to about 2; y is from about 1 to about 10; z is from 0 to about 100; X is a halide anion other than fluorine, or combination of halide anions that excludes fluorine; and w is greater than 0. The pore size of the sieves can be adjusted by ion exchanging $M_1$ cations with a suitable amount of another species. Embodiments of the invention are useful for various adsorptive fluid separation processes, including pressure swing adsorption processes. For example, disclosed embodiments are useful for separating methane from air.

19 Claims, 12 Drawing Sheets

(56) References Cited

OTHER PUBLICATIONS

R.M. Barrer, Hydrothermal Chemistry of Zeolites Isomorphous Replacements 1982, p. 292-293.

G. Perego et al, Titanium-Silicalite: a Novel Derivative in the Pentasil Family, Proceedings of 7th International Zeolite Conference 1986, pp. 129-136.

A.N. Mer'Kov et al, New Minerals and First Finds in the USSR, Zapiski Vsesoyuznogo Mineralogichiskogo Obshchevstva 1973, Part C11, No. 1, pp. 54-62.

P.A. Sandomirskii et al, The OD Structure of Zorite, Sov. Phys. Crystallogr. 24(6), Nov.-Dec. 1979, pp. 686-693.

Hongbin Du et al., "Synthesis and characterization of titanium silicate molecular sieves with zorite-type structure," Microporous Materials, 7 (1996), pp. 73-80.

P. A. Sandomirskii et al., "The OD structure of zorite," Sov. Phys, Crystallogr. 24(6), Nov.-Dec. 1979, pp. 686-693.

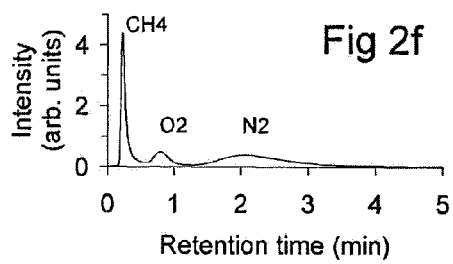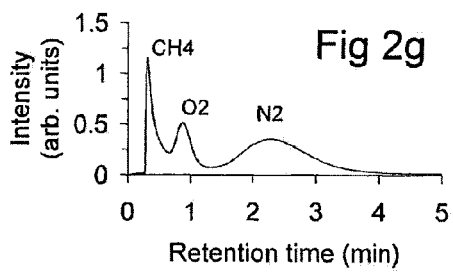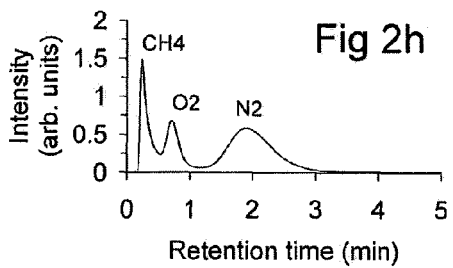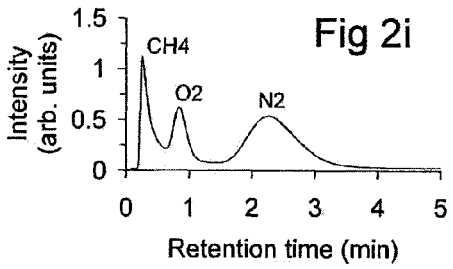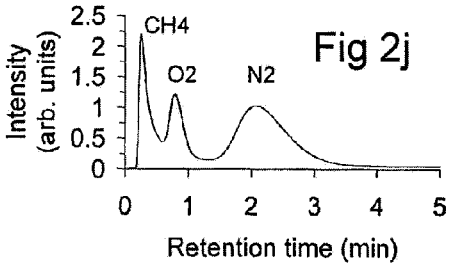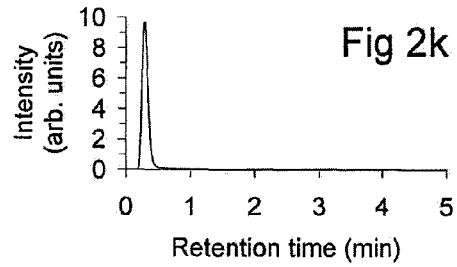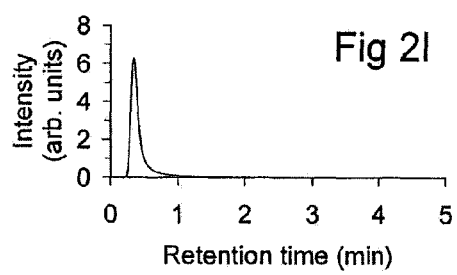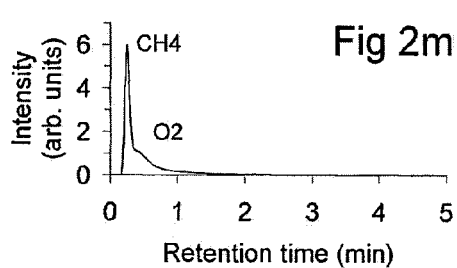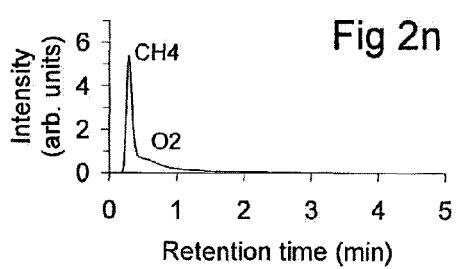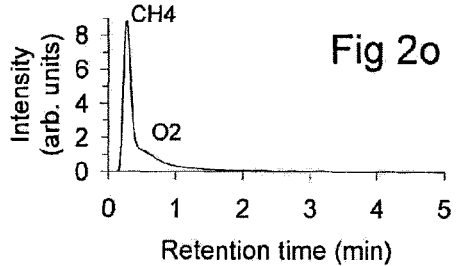

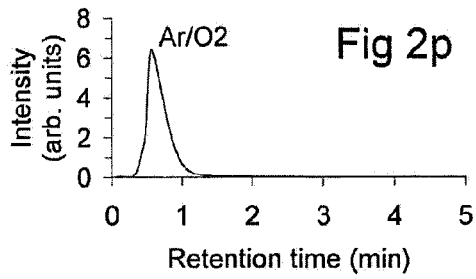
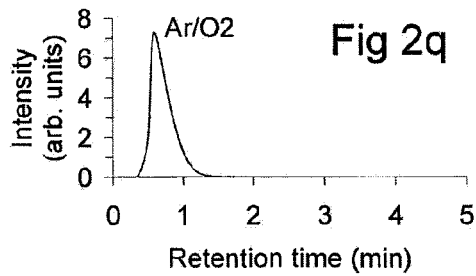
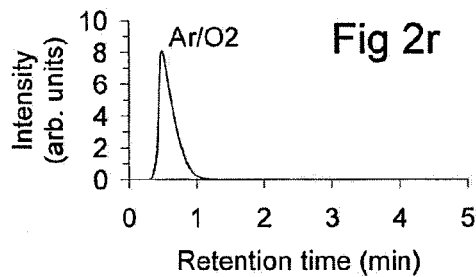
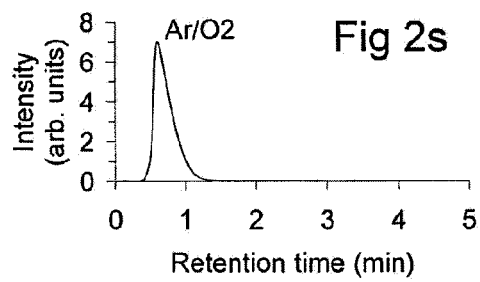
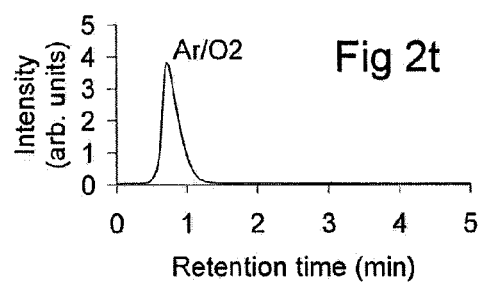
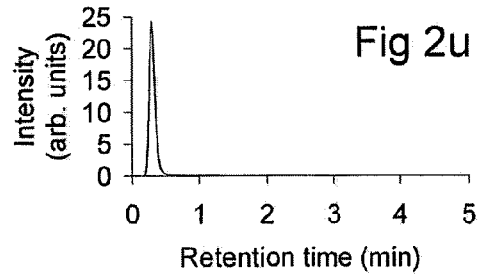
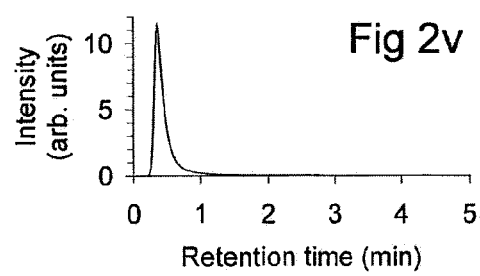
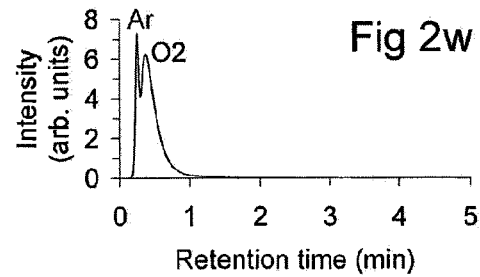
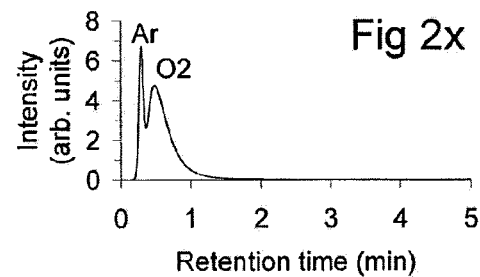
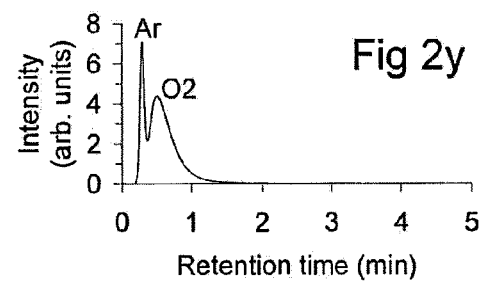

SILICATE MATERIALS, METHOD FOR THEIR MANUFACTURE, AND METHOD FOR USING SUCH SILICATE MATERIALS FOR ADSORPTIVE FLUID SEPARATIONS

CROSS REFERENCE TO RELATED APPLICATIONS

This is a continuation of U.S. patent application Ser. No. 12/308,550, filed on Dec. 16, 2008, now abandoned, which is the U.S. National Stage of International Patent Application No. PCT/US2007/014523, filed on Jun 22, 2007, which was published in English under PCT Article 21(2), which in turn claims the benefit of U.S. Provisional Application No. 60/817,536, filed on Jun. 28, 2006. Both prior applications are incorporated herein in their entirety.

FIELD

The present disclosure concerns a method for making silicate materials, such as titanium silicates, materials made by the method, and embodiments of a method for using such materials for adsorptive fluid separations.

BACKGROUND

I. Zeolites

Zeolites typically are considered to be crystalline, porous aluminosilicates. In the late 1950s, Milton and coworkers (U.S. Pat. Nos. 2,882,243 and 2,882,244) determined that uniformly porous, internally charged aluminosilicate crystals could be made analogous to molecular sieve zeolites found in nature. Synthetic aluminosilicate zeolite molecular sieves are now used in numerous, commercially important catalytic, adsorptive and ion-exchange applications. Aluminosilicate zeolites provide a unique combination of high surface area and uniform porosity that is dictated by the "framework" structure of the zeolite crystals coupled with the electrostatically charged sites induced by coordinated metal atoms, such as tetrahedrally coordinated $Al^{+3}$. Many "active" charged sites are readily accessible to molecules of the proper size and geometry for adsorptive or catalytic interactions. Further, the charge-compensating cations are electrostatically, not covalently, bound to the aluminosilicate framework. As a result, such cations are generally base exchangeable for other cations with different inherent properties. This provides significant flexibility for modifying active sites whereby specific adsorbents and catalysts can be tailored for a particular utility.

While a relatively large number of aluminosilicate materials are theoretically possible (see, for example, "Zeolite Molecular Sieves," Chapter 2, 1974, D. W. Breck), to date only a relatively small number (approximately 150) have been identified. While compositional nuances have been described in publications, such as U.S. Pat. Nos. 4,524,055, 4,603,040 and 4,606,899, totally new aluminosilicate framework structures are rarely discovered. As a result, various approaches have been taken to replace aluminum or silicon in zeolite syntheses ostensibly to (1) generate either new zeolite-like framework structures or (2) induce the formation of qualitatively different active sites than are available in analogous aluminosilicate-based materials. E. M. Flanigan and coworkers have prepared aluminophosphate-based molecular sieves. (*J. Am. Chem. Soc.*, 104, p 1146 (1982); Proceedings of the 7th International Zeolite Conference, pp. 103-112, 1986). However, the site-inducing $Al^{+3}$ is essentially neutralized by the $P^{+5}$, imparting a zero net charge to the framework. Thus, while a new class of "molecular sieves" was created, they lack "active" charged sites.

Realizing this inherent deficiency, there is a new emphasis on synthesizing mixed aluminosilicate-metal oxide and mixed aluminophosphate-metal oxide framework systems. This has generated approximately 200 new compositions. All of these new compositions suffer either from the active-site-removing effect of incorporated $P^{+5}$ or the site-diluting effect of incorporating an effectively neutral, tetrahedral +4 metal into an aluminosilicate framework. No significant utility has been demonstrated for any of these materials.

The most straightforward method for potentially generating new structures or qualitatively different sites than those induced by aluminum would be direct substitution of some charge-inducing species for aluminum in a zeolite-like structure. The most notably successful example of this approach appears to be substitutions using boron, in the case of ZSM-5 analogs, or iron. [See, for example, EPA 68,796 (1983), Taramasso et al., Proceedings of the 5th International Zeolite Conference, pp. 40-48 (1980); J. W. Ball et al., Proceedings of the 7th International Zeolite Conference, pp. 137-144 (1986); and U.S. Pat. No. 4,280,305 to Kouenhowen et al.] The substituting species is incorporated only at low amounts, which raises doubt concerning whether the species are occluded or framework incorporated.

U.S. Pat. No. 3,329,481 ostensibly describes a method for synthesizing charge-bearing (exchangeable) titaniumsilicates under conditions similar to aluminosilicate zeolite formation if the titanium was present as a "critical reagent" peroxo species. These materials were called "titanium zeolites." No evidence, other than some questionable X-ray diffraction (XRD) patterns, was presented to support this conclusion. The conclusions stated in the '481 patent generally have been dismissed by the zeolite research community. [See, for example, D. W. Breck, Zeolite Molecular Sieves, p. 322 (1974); R. M. Barrer, Hydrothermal Chemistry of Zeolites, p. 293 (1982); G. Perego et al., Proceedings of 7th International Zeolite Conference, p. 129 (1986).] For all but one end member of this series of materials (designated TS materials), the XRD patterns presented indicate phases too dense to be molecular sieves.

Naturally occurring titanosilicates also are known. For example, a naturally occurring alkaline titanosilicate, identified as "Zorite," was discovered in trace quantities on the Siberian Tundra in 1972. See, A. N. Mer'kov et. al, Zapiski Vses Mineralog. Obshch., pp. 54-62 (1973). The published XRD pattern was challenged and a proposed structure was later reported in an article entitled "The OD Structure of Zorite," Sandomirskii et al., Sov. Phys. Crystallogr. 24 (6), November-December 1979, pp. 686-693.

In 1983, trace levels of tetrahedral Ti(IV) were reported in a ZSM-5 analog. M. Taramasso et al.; U.S. Pat. No. 4,410,501 (1983); G. Perego et al., Proceedings of the 7th International Zeolite Conference, p. 129 (1986). More recently, mixed aluminosilicate-titanium(IV) structures have been reported [EPA 179,876 (1985); EPA 181,884 (1985)] which, along with TAPO [EPA 121,232 (1985)], appear to have no possibility of active titanium sites, and hence likely no utility.

II. U.S. Pat. Nos. 4,853,202, 4,938,939, and 5,989,316

U.S. Pat. No. 4,853,202, entitled "Large-Pored Crystalline Titanium Molecular Sieve Zeolites," and U.S. Pat. No. 4,938,939, entitled "Preparation of Small-pored Crystalline Titanium Molecular Sieve Zeolites," name Steve Kuznicki as inventor. Both the '202 patent and the '939 patent are incorporated herein by reference. The '202 patent discloses "ETS molecular sieve zeolites." The '939 patent discloses a class of compounds referred to as ETS-4 having a pore size of from 3-5 Å. Table 1 below provides relative amounts of materials used to prepare ETS-4 as per Example 4 in the '939 patent.

TABLE 1

Adsorbent ETS-4 (091504)

| Reagent | Amount |
|---|---|
| Sodium Silicate | 25.1 grams |
| Sodium Hydroxide | 4.6 grams |
| KF | 3.8 grams |
| TiCl$_3$ | 16.3 grams |
| Temperature-Time | 150° C./170 hours |
| Ion-Exchange | 10 grams ETS-4, 20 grams BaCl$_2$, and 40 grams H$_2$O @ 200° C. |

According to the '202 patent and the '939 patent, which share significant common text:

These titanium silicates have a definite X-ray diffraction pattern unlike other molecular sieve zeolites and can be identified in terms of mole ratios of oxides as follows:

$$1.0\pm0.25\ M_{2/n}O{:}TiO_2{:}ySiO_2{:}zH_2O$$

wherein M is at least one cation having a valence of n, y is from 1.0 to 10.0, and z is from 0 to 100. In a preferred embodiment, M is a mixture of alkali metal cations, particularly sodium and potassium, and y is at least 2.5 and ranges up to about 5.

The '939 patent, column 2, lines 39-50. Moreover, according to the '939 patent:

It should be understood that this X-ray diffraction pattern is characteristic of all the species of ETS-4 compositions. Ion exchange of the sodium ion and potassium ions with cations reveals substantially the same pattern with some minor shifts in interplanar spacing and variation in relative intensity. Other minor variations can occur depending on the silicon to titanium ratio of the particular sample, as well as if it had been subjected to thermal treatment. Various cation exchanged forms of ETS-4 have been prepared and their X-ray powder diffraction patterns contain the most significant lines set forth in Table 1.

The '939 patent, column 4, lines 32-45.

Regardless of the synthesized form of the titanium silicate the spatial arrangement of atoms which form the basic crystal lattices remain essentially unchanged by the replacement or sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table T above.

The '939 patent, column 6, lines 4-12.

U.S. Pat. No. 5,989,316, entitled "Separation of nitrogen from mixtures thereof with methane utilizing barium exchanged ETS-4" discloses barium-exchanged compositions of ETS-4 which show particular utility in gas separation processes involving the separation of nitrogen from a mixture of the same with methane. The barium cation exchange can make the resulting composition more stable to heating. Heating to elevated temperatures is often required to activate the composition for use in adsorption applications.

Depending on synthesis conditions, these and other crystalline titanium molecular sieve zeolites of the prior art may have comprised fluorine plus possibly other halides prior to ion exchanging the M cations. However, no measurable (significant) halide content remains after the ion exchanging.

SUMMARY

Embodiments of crystalline, titanium silicate molecular sieves are described having a formula representing mole ratios of oxides of $$nM_1O{:}TiO_2{:}ySiO_2{:}zH_2O{:}wX$$

where $M_1$ refers to at least one metal cation; n is from about 1 to about 2; y is from about 1 to about 10; z is from 0 to about 100; X consists of halide anions other than fluorine; and w is greater than 0. In particular, X can be Cl and w can be between about 0.01 and 1.

A process for making crystalline titanium silicate molecular sieves also is described. One embodiment of the disclosed process for preparing a titanium silicate molecular sieve comprises combining a source of silicon, a source of titanium, a source of alkalinity, a metal salt, and a halide anion source other than fluorine. The mole ratio of $SiO_2/TiO_2$ is greater than about 1; $H_2O/SiO_2$ is greater than about 2; and $M_1/SiO_2$ is from about 0.1 to about 10. $M_1$ is a metal cation, or mixture of cations. The composition is processed at a temperature and for a period of time effective to produce desired titanium silicate molecular sieves.

The process can further comprise performing ion exchange on the titanium silicate molecular sieve to produce an ion-exchanged titanium silicate molecular sieve. This produces an ion-exchanged molecular sieve having a formula representing mole ratios of oxides of $$nM_2O{:}TiO_2{:}ySiO_2{:}zH_2O{:}wX$$

wherein $M_2$ is also at least one metal cation and n is from about 1 to about 2. For particular disclosed embodiments, $M_1$ can comprise sodium and/or potassium. Barium can be exchanged for the $M_1$ cations thereby resulting in $M_2$ comprising barium, sodium, and potassium. The ion exchange step in the process can be used to adjust the pore size of the titanium silicate molecular sieve.

Titanium silicate molecular sieves of the present invention also can be used to prepare compositions. For example, such compositions can comprise a titanium silicate molecular sieve according to the present invention, and from greater than zero weight percent to less than one hundred percent of at least one additional material. The at least one additional material typically is an inert material, an active material, or combinations thereof, and more specifically typically is a synthetic zeolite, a naturally occurring zeolite, a desiccant, a catalyst, a clay, silica, a metal oxide, or combinations thereof.

Embodiments of adsorbers for use in an adsorption separation process also are described. For example, the adsorber may comprise an adsorbent housing or a substrate, and at least one disclosed embodiment of a titanium silicate molecular sieve in the housing or on the substrate. Disclosed adsorbers can be a packed bed comprising the titanium silicate molecular sieve. Alternatively, the titanium silicate molecular sieve may be on a substrate, such as a flexible substrate that can be spirally wound.

Adsorptive fluid separation processes also are described, comprising providing a crystalline titanium silicate molecular sieve and contacting the molecular sieve with a feed fluid mixture comprising at least a first component and a second component. This produces at least one product fluid enriched in the first component relative to the second component. A particular embodiment of a disclosed adsorptive fluid separation process comprises providing a crystalline titanium silicate molecular sieve and contacting the titanium silicate molecular sieve with a feed fluid mixture comprising methane to produce at least one product fluid enriched in methane using an adsorption process. For example, certain disclosed embodiments of the process concern adsorptive separation of carbon oxides [carbon monoxide (CO) and/or carbon dioxide ($CO_2$)], nitrogen ($N_2$), oxygen ($O_2$), and/or hydrogen sulfide ($H_2S$) to produce an enriched natural gas product. Such process may be a pressure swing process, a partial pressure swing process, a temperature swing process, a vacuum pressure swing process, or combinations thereof. Moreover, the process can be implemented in a rapid cycle pressure swing adsorption device, that is a device capable of operating at cycle speeds preferably in excess of about 1 cycle per minute, even more preferably in excess of about 5 cycles per minute.

The foregoing and other objects, features, and advantages of the invention will become more apparent from the following detailed description, which proceeds with reference to the accompanying figures.

BRIEF DESCRIPTION OF THE DRAWINGS

FIGS. 2f-2o are gas chromatograms of the elution of a methane-air mixture through Samples C3-C7 and 6-10 respectively in the Examples.

FIGS. 2p-2y are gas chromatograms of the elution of an argon-oxygen mixture through Samples C3-C7 and 6-10 respectively in the Examples.

FIGS. 2z-2ac are gas chromatograms of the elution of a methane-air mixture through Samples 11-14 respectively in the Examples.

FIGS. 2ad-2ag are gas chromatograms of the elution of an argon-oxygen mixture through Samples 11-14 respectively in the Examples.

FIGS. 2ah-2ai are gas chromatograms of the elution of an argon-oxygen mixture through Samples 22-23 respectively in the Examples.

DETAILED DESCRIPTION

I. Introduction

Figure 1A:
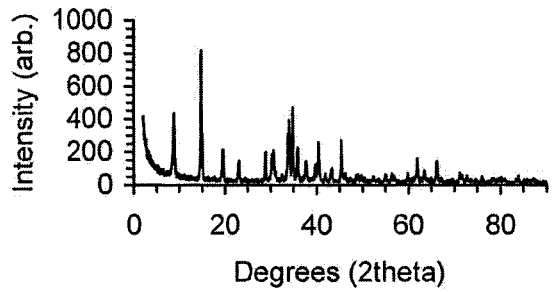
FIG. 1a is a powder XRD pattern for ETS-4, a prior art material made according to the process described in Example 4 of U.S. Pat. No. 4,938,939 and designated as comparative Sample C1 in the Examples.
Figure 1B:
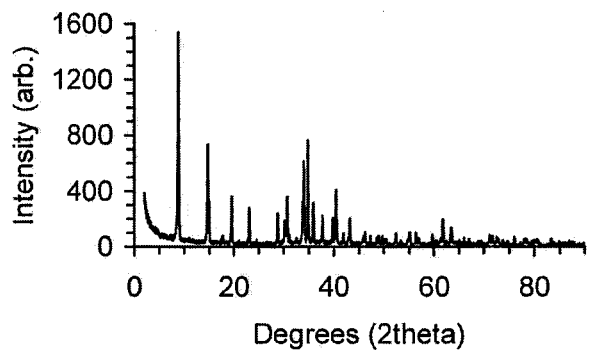
FIG. 1b is a powder XRD pattern for one embodiment of a reduced pore zorite material of the present invention designated as Sample 1 in the Examples.
Figure 1C:
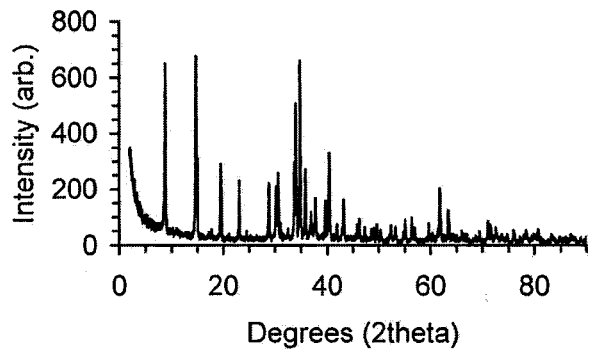
FIG. 1c is a powder XRD pattern for one embodiment of a reduced pore zorite material of the present invention designated as Sample 3 in the Examples.
Figure 1D:
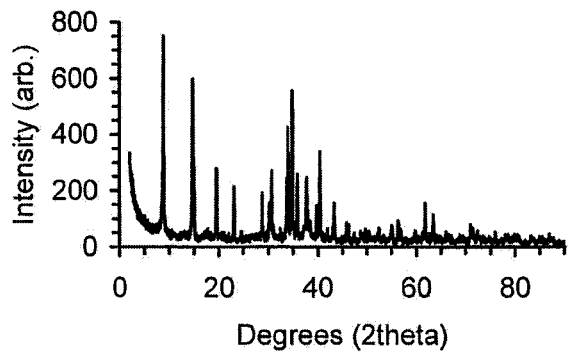
FIG. 1d is a powder XRD pattern for one embodiment of a reduced pore zorite material of the present invention designated as Sample 2 in the Examples.
Figure 1E:
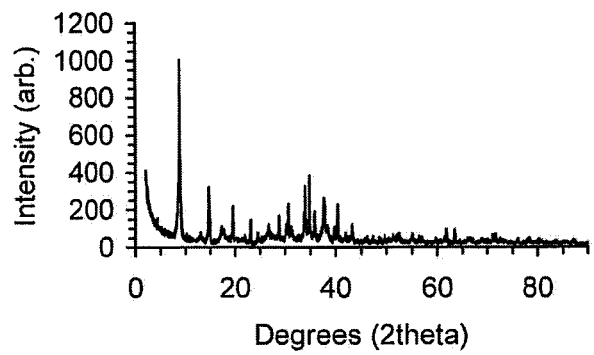
FIG. 1e is a powder XRD pattern for one embodiment of a reduced pore zorite material of the present invention designated as Sample 4 in the Examples.

Unless expressly defined otherwise, all technical and scientific terms used herein have the same meaning as commonly understood by a person of ordinary skill in the art to which this disclosure belongs. The singular terms "a," "an," and "the" include plural referents unless the context clearly indicates otherwise. Similarly, the word "or" is intended to include "and" unless the context clearly indicates otherwise.

The term "includes" means "comprises."

pH as used herein either refers to i) when preparing the crystalline molecular sieve, the pH of the reaction mixture before crystallization diluted 100:1 by volume with water and equilibrated for 1 minute; or ii) when ion exchanging cations or anions in the molecular sieve, the as-measured pH value of the solution or slurry.

The separations described herein can be partial, substantial or complete separations unless indicated otherwise. All percentages recited herein are weight percentages unless indicated otherwise. In the case of conflict, the present specification, including explanations of terms, will control.

The materials, methods, and examples described herein are intended to be illustrative only and are not intended to limit the invention to the specific materials, methods and examples disclosed.

Titanium Silicate Molecular Sieves

The present invention concerns titanium silicate molecular sieves. These materials are substantially stable, both chemically and thermally. Moreover, the physical properties of certain embodiments of the materials, such as pore size and adsorptive characteristics, also are substantially stable, even with varying ambient conditions, such as temperature. Certain embodiments of disclosed molecular sieves are metal-exchanged titanium silicates. And, most adsorptive separation embodiments use crystalline phases of the disclosed titanium silicate molecular sieves.

Zeolites typically have been considered to be crystalline, porous aluminosilicates. Relatively recent discoveries of materials virtually identical to the classical zeolite, but comprising structures with elements other than silicon and aluminum, have stretched the definition. Most researchers now define zeolite to include virtually all types of porous oxide structures that have well-defined pore structures due to a high degree of crystallinity. Typically, the metal atoms (classically, silicon or aluminum) are surrounded by four oxygen anions to form an approximate tetrahedron consisting of a metal cation at the center and oxygen anions at the four apexes. The tetrahedral metals, called T-atoms for short, stack in regular arrays to form channels. The stacking possibilities are virtually limitless, and more than a hundred unique structures are known. Titanium silicate molecular sieves of the present invention do not necessarily include tetrahedrally coordinated metal atoms, such as titanium, and instead certain embodiments may be mixed-coordination materials where metal atoms may be in coordination states other than tetrahedral.

The structure of channels (or pores) are nanoscopically small, and have molecular-size dimensions such that they often are termed "molecular sieves." Without being bound by a theory of operation, as currently understood the size, shape, and electric charge potential of the channels determine the properties of these materials, which allows the materials to be used for various purposes, including adsorption separation processes. Molecules can be separated, for example, via shape, size effects related to their possible orientation in the pore, and/or by differences in strength of adsorption.

A. Compositions of Titanium Silicate Molecular Sieves

Certain disclosed embodiments of titanium silicate molecular sieves of the present invention typically have molecular compositions where the mole ratios of oxides are as indicated by the following formula.

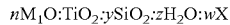

$$nM_1O:TiO_2:ySiO_2:zH_2O:wX$$

With reference to this formula, $M_1$ refers to a metal cation or mixture of metal cations, n can range from about 1 to about 2; y is from about 1 to about 10 more typically at least 2 and up to about 5; z is from 0 to about 100, more typically from about 5 to about 60, even more typically from about 5 to about 40; X is a halide anion or mixture of halide anions other than fluorine, and w is greater than 0, typically between about 0.01 and about 1.

The general formula provided above describes the genus of titanium silicate molecular sieves of the present invention. A person of ordinary skill in the art will appreciate that general formulae describing sub-genera within the broad genus also are possible.

This general formula applies to compounds made both with and without cation exchange. Prior to exchange, $M_1$ typically is a Group I metal ion (or ions) that is provided by an alkaline metal compound, such as a Group I metal hydroxide, typically sodium or potassium hydroxide. The initial cation, or mixture of cations, that are provided by initial reactants prior to conducting an exchange reaction can be replaced, at least in part or substantially completely, with other cations using cation exchange techniques. Working examples of cation exchange reactions are further disclosed in the Examples below. Thus, for these metal-exchanged titanium silicate molecular sieves, suitable replacing metals include metals of IUPAC classification Groups 1-3 metals, Group 8-12 metals, alkaline earth metals, rare earth metals, and all combinations thereof. A currently preferred group of metals for exchange with, for example, sodium and/or potassium in a non-exchanged titanium silicate molecular sieve is barium, calcium, potassium, strontium, magnesium and silver. A currently preferred metal is barium, which provides good thermal stability in compounds made to date.

It also is possible to conduct other types of exchange reactions that exchange positively-charged materials (other than metals) for metals such as sodium and/or potassium that are present in disclosed titanium silicate molecular sieves prior to exchange reactions. For example, typical replacing components would include, but are not limited to, hydrogen, ammonium, aliphatic ammonium, most typically alkyl ammonium, aryl ammonium, metals, and mixtures thereof.

B. Ordered Crystal Structure and XRD Patterns

X-ray diffraction is primarily used to determine atomic arrangements in crystalline materials. "Crystal" refers to a region of matter within which the atoms are arranged in a three-dimensional, translationally periodic pattern, which is referred to as the crystal structure.

A lattice is an imaginary pattern of points (or nodes) in which every point (node) has an environment that is identical to that of any other point (node) in the pattern; it has no specific origin, as it can be shifted parallel to itself. Lattice points can be notated using a crystal coordinate system. A point in the lattice is chosen as the origin and is defined as 000. The a, b and c axes define directions within the crystal structure, with the angular relations thereof being defined by a particular crystal structure.

Lattice planes are defined in terms of Miller Indices, which are reciprocals of the intercepts of the planes on the coordinate axes. A Miller index refers to a family of parallel lattice planes defined by a fixed translation distance (defined as d) in a direction perpendicular to the plane. The perpendicular distances separating each lattice plane in a stack is denoted by the letter d, and are referred to as d spacings, which can be used to describe peaks in an XRD pattern.

The titanium silicate molecular sieves of the present invention are either produced in crystalline form, or can be produced amorphous and subsequently crystallized. In the below Examples, XRD patterns for ETS-4 materials (i.e. zorite) produced according to the '939 patent have been compared to titanium silicate molecular sieves of the present invention using the same XRD device. The crystal structure of the present molecular sieves have substantially similar lattice spacings to the zorite. However, in some embodiments and unlike that of zorite, the present molecular sieves can have an XRD pattern in which at least one peak has an intensity greater than an intensity of a peak at a d-spacing of 6.96 Å.

For ETS materials, no other peak in the XRD pattern is more intense, i.e. higher, than the peak at a d-spacing of about 7 Å, and hence this peak was selected to be the reference peak. It is typical to normalize all peak intensities in an XRD pattern to a reference peak. Therefore, all other peaks in XRD patterns used to compare titanium silicate molecular sieves of the present invention to the ETS materials of the '202 and '939 patents were normalized to the reference peak at a d-spacing of about 7 Å.

C. Pore Size of Disclosed Molecular Sieves

Materials made according to the present invention have a pore size that (1) is stable, and (2) can be varied within a pore size range to provide a pore size effective for performing a particular purpose, such as for adsorptive fluid separations. This pore size range typically varies from a pore size of generally greater than about 2 Å to at least about 5 Å, and more typically from about 2.5 Å to about 4.5 Å. These pore sizes are deduced from empirical studies based on fluid separations of molecules of known sizes. For instance, the molecular diameter of various gases is given in *Zeolite Molecular Sieves*, by D. W. Breck, reprinted 1984. If an adsorbent material is then capable of separating two gases of differing molecular diameter (e.g. one gas is adsorbed while the other is not), it is deduced that the pore diameter of the adsorbent material lies somewhere between the molecular diameters of the two gases.

As an example, certain embodiments of the present molecular sieves, such as a molecular sieve comprising chloride anions and having initial IUPAC classification Group I metal ions, such as sodium ions, at least partially exchanged with barium cations, have been brought into contact with a fluid stream comprising a fluid mixture of nitrogen and methane and to enrich a fluid product stream in a desired component, such as methane. These particular titanium silicate molecular sieve embodiments preferentially adsorb nitrogen. Separating nitrogen from methane in a fluid mixture comprising the two based on size is a relatively difficult separation as nitrogen has a diameter of about 3.6 Å, and methane has a diameter of about 3.8 Å. The pore size of these particular sieve embodiments then is deduced to be between 3.6 Å and 3.8 Å.

Pore size also has been deduced by water molecule adsorption trials. Water has a mean van der Waals diameter of about 2.82 Å. Titanium silicate molecular sieves made according to working embodiments of the present invention but prior to any exchange reaction, typically have small pores that adsorb only water molecules. Metal exchanged titanium silicate molecular sieves may have larger pore sizes. Divalent metal-exchanged titanium silicate molecular sieves typically have larger pore sizes than the as-made compositions.

Thus, a person of ordinary skill in the art will appreciate that titanium silicate molecular sieves of the present invention are highly adsorptive toward molecules of a particular size range. This size range varies from at least about 2 Å up to approximately 5 Å, more typically from about 3 Å to about 4.5 Å in diameter. As a result, these titanium silicate molecular sieves are substantially non-adsorptive to molecules having effective diameters larger than about 5 Å in critical diameter.

The utility of a particular titanium silicate molecular sieve depends, at least in part, on the composition of a fluid mixture contacting the molecular sieve. The titanium silicate molecular sieve is most efficient if its pore size is tailored for selective adsorption of a particular constituent of a fluid mixture. Thus, one beneficial aspect of the present invention is the ability to control pore size through a variety of mechanisms.

A first, new and surprising method for controlling pore size is through the incorporation of halide anions other than fluorine in the molecular sieves. This is accomplished via suitable selection of halide anions present in the synthesis mixture, and hence reagents suitable for providing such anions, that are used to form the titanium silicate molecular sieves. In particular, the halide anion can be chlorine.

Pore size can however be varied by selecting different halide species or combinations of halide species that do not include fluorine. For example, working embodiments of new titanium silicate molecular sieves have been produced by using different halide anions, typically titanium silicate molecular sieves where the halide is chloride or iodide. Bromide is also expected to be a useful anion choice. A series of barium-sodium exchanged titanium silicate molecular sieves have been made using various halides. Barium-exchanged, titanium silicate molecular sieves containing iodide, for example, may adsorb only molecules that are as small as carbon dioxide or smaller, i.e. about 3.3 Å or smaller. Barium-exchanged, titanium silicate molecular sieves containing chloride had larger pore sizes, about 3.7 Å, and are useful for separating, for example, methane from a fluid mixture comprising both methane and nitrogen. Prior art, barium-exchanged, titanium silicate molecular sieves synthesized with only potassium fluoride added to the synthesis mixture appear to have the largest pore size, i.e. about 3.7 Å to about 4.0 Å, within the family of barium-sodium exchanged titanium silicate molecular sieves made. Some anion sources may introduce hydroxyl anions into the framework. This may affect the pore size of the adsorbent.

A second method for controlling pore size is to control processing parameters such as temperature and pH. For example, the pH of the synthesis mixture can be adjusted to facilitate production of titanium silicate molecular sieves of varying pore sizes. Working embodiments of the present invention have adjusted the pH of a processing solution from a first pH of about 10.5 to about 13, to provide a variation in pore size of from about 0.1 Å to about 0.5 Å. Alternatively, the pH of the ion-exchange solution can be adjusted to control the pore size of the exchanged material. The pH of the exchange solution is limited by the stability of the material to the condition of the solution. Titanosilicate molecular sieves are significantly more acid resistant compared to conventional aluminosilicate molecular sieves. As a result, inventive materials examined to date have displayed stability to exchange solutions having a pH between 2 and 13.

Certain embodiments of titanium silicate molecular sieves of the present invention, particularly rare earth-exchanged titanium silicate molecular sieves, even more particularly barium-exchanged titanium silicate molecular sieves, have a high degree of thermal stability at a temperature of at least as high as about 200° C., preferably at least as high as about 300° C., even more preferably at least as high as about 400° C., and yet even more preferably to a temperature of at least as high as 450° C. These materials therefore are effective for use in high temperature catalytic processes. Furthermore, because these titanium silicate molecular sieve embodiments have framework stability at these elevated temperatures, the pore size of the as-synthesized material remains substantially constant throughout this temperature range as well.

However, other embodiments of titanium silicate molecular sieves within the scope of the present invention change pore size with temperature changes, such as by contracting during a heating cycle. The pore size also typically changes substantially uniformly over the temperature heating range. As a result, heating is another example of a process variable that can be used to vary pore size of disclosed titanium silicate molecular sieves. Thus, a desired pore size can be obtained by controlling process temperature, and can be determined, for example, by providing or consulting a pore size versus temperature plot. Heating temperatures between about 100° C. and about 500° C. provide materials having suitable pore sizes.

Yet another, and particularly useful, method for controlling pore size of exchanged materials is to control the degree of metal exchange, or the exchange mixture of cations. For example, if a titanium silicate molecular sieve is subjected to barium metal exchange, then the absolute degree of barium exchange for a particular cationic metal, such as potassium or sodium, can vary as discussed herein. Similarly, the relative amounts of the mixture of initial ions, sodium and potassium for example, also can vary. Pore size also can be adjusted by controlling the exchange reaction(s).

It has been observed that the anion species previously incorporated in the material can be lost as a result of ion exchanging the cation species. However, the rate at which the anion species is lost or removed during a given cation exchange process seems much reduced in the present materials as compared to the rate of anion loss in prior art materials synthesized using potassium fluorine as an anion source in the synthesis mixture. This decreased rate of anion loss enhances the ability to control the pore size of the adsorbent.

III. General Synthetic Approach

A. Titanium Silicate Molecular Sieves

Titanium silicate molecular sieves of the present invention can be prepared from a reaction mixture containing suitable sources of each reagent used in amounts effective to produce desired materials. For example, the molecular sieves of the present invention typically are titaniumsilicates. The reaction mixture used to make such molecular sieves therefore includes a source of titanium and a source of silicon. Suitable sources of titanium include titanium salts, such as halide salts, carbonate salts, sulfate salts, nitrate salts, phosphate salts, and combinations thereof. A person of ordinary skill in the art will appreciate that other counter anions also potentially can be used.

The reaction mixture also typically includes a reactive source of silicon. Examples of suitable sources of silicon include, but are not limited to, silica, silica hydrosol, silica gel, silicic acid, alkoxides of silicon, alkali metal silicates, preferably sodium or potassium silicates, and mixtures of these silicon sources.

The reaction mixture also typically includes a suitable source of alkalinity. Typically this is provided by an alkali metal hydroxide, preferably an aqueous solution of an alkali metal hydroxide, such as sodium hydroxide or potassium hydroxide. This reagent provides a source of alkali metal ions for maintaining electrovalent neutrality in the crystallized product. It also controls the pH of the reaction mixture within a range effective to produce desired compounds, such as a pH range of from about 10.5 to about 13, more typically from about 10.8 to about 11.5.

Appropriate materials, such as a source of titanium, a source of silicon, a suitable source of alkalinity, and a source of halide anions other than fluorine, are combined to form a reaction mixture comprising relative amounts of each reagent effective to produce desired compounds. The synthesis of such materials is not significantly dependent on the quantity of silica or water in the system. In systems containing large amounts of silica, the unreacted amount is filtered and washed away from the crystallized adsorbent. It is also possible to synthesize zeolites and other microporous materials from solutions containing large amounts of water ($H_2O$:$TiO_2$>100). The amount of adsorbent crystallized from such a reaction would be lower than from a reaction containing less water but large $H_2O$:$TiO_2$ ratios do not necessarily inhibit the synthesis of the target molecular sieve. Effective relative mole ratios of each reagent can be determined empirically, but for working examples generally have been substantially equal molar amounts, perhaps with a slight excess of the reagent providing a source of alkalinity. More specifically, and with reference to working embodiments, about 0.1 mole of a suitable source of silicon, about 0.02 mole of a suitable source of titanium, and about 0.11 mole of a suitable source of alkalinity have been used. Working embodiments also include a suitable source of a halide anion, that has varied in such working embodiments from an amount greater than about 0.01 mole to about 0.1 mole, more typically greater than about 0.02 mole to about 0.08 mole, and even more typically from about 0.04 to about 0.06 mole.

The reaction mixture is heated at a temperature, and for a period of time, suitable to produce desired compounds. For working embodiments, the processing temperature typically varied from greater than ambient to at least as high as about 300° C., more typically from about 50° C. to about 250° C., and even more typically from about 100° C. to about 225° C.

The reaction period generally is a few hours up to a period of many days. More typically the reaction period ranges from about 8 hours to about 48 days, and even more typically from about 8 hours to about 48 hours. The reaction may result in the production of a crystalline product. Thus, another method for determining the reaction period is to allow the reaction to continue until crystals are formed. The resulting crystalline product is thereafter separated from the reaction mixture, cooled to room temperature, filtered and water washed. The reaction mixture can be stirred, although it is not necessary to do so.

Titanium silicate molecular sieves of the present invention can be amorphous, and thereafter crystallized, or can be crystalline, and recrystallization used to enhance, for example, product purity. Crystallization can be performed either as a continuous process, or as a batchwise process under autogeneous pressure in an autoclave or static pressure vessel. Isolated crystalline products typically are washed, such as by using a water washing step, and then dried at a suitable drying temperature for a period of time effective to provide the desired level of product hydration, such as a drying temperature of greater than about 100° C. to at least about 300° C., and typically a drying temperature of about 275° C. The heating process continues for as long as is required to obtain a product with a desired water content, which ranges from as low as is technically and commercially feasible in such a material, e.g. 0.01 weight percent to about 5 weight percent. Titanium silicate molecular sieves of the present invention may include significant amounts of moisture in the framework and still be effective for use in adsorption separation processes. By way of comparison, a water content of about 0.5% typically reduces the effectiveness of known zeolites for use in adsorption separation processes.

B. Exchange Reactions

Titanium silicates as synthesized can have the original components thereof replaced or exchanged using techniques known in the art. Cationic components, such as metal atoms, are typical exchange candidates. Typical classes of reagents used for positive ion exchange reactions include, but are not limited to, hydrogen, ammonium, alkyl ammonium, aryl ammonium, metals, and mixtures thereof. Metals are a currently preferred class of reagents used for exchange reactions. Suitable replacing metals include, without limitation, metals of IUPAC Classification Groups 1-3 and 8-12 of the Periodic Table, the rare earth metals, and preferably the alkaline earth metals beryllium, magnesium, calcium, strontium and barium, with barium being a currently preferred metal for conducting exchange reactions.

For working embodiments exemplified by barium exchange, a non-exchanged titanium silicate molecular sieve is first produced as disclosed herein. A mixture is then formed comprising a suitable source of barium, such as a metal halide, for example barium chloride ($BaCl_2$) and the non-exchanged titanium silicate molecular sieve. The mixture can be formed as a dry mixture, and then added to water, or can be added individually to water to form an aqueous composition. The relative amounts for these reagents can be varied, as will be appreciated by a person of ordinary skill in the art, to vary the amount of metal-metal exchange, but such amounts typically range from weight ratios of about 1:1 to about 2:1 barium exchange material to non-exchanged titanium silicate molecular sieves. The aqueous composition is then exposed to a temperature, and for a period of time, effective to produce desired compounds. For example, working embodiments typically refluxed the aqueous composition at 100° C. for about 1 hour or more. Alternatively, the mixture can be charged in an autoclave and heated at temperatures of at least 100° C. for at least one hour.

The amount of halide anion present in the molecular sieve can have an influence on the pore size of the adsorbent and compositions of the present invention show correlations between halogen content and effective pore size.

C. Post Formation Processing

Compositions made according to the present invention can be subjected to additional post synthesis processing. For example, such compositions can be calcined at an effective calcining temperature that, for working embodiments, was within a temperature range of from about 500° F. to at least about 1,500° F., and more typically was about 1,000° F. Calcining continues for periods of time ranging from about 1 to at least as long as about 48 hours. This results in ammonia evolution and hydrogen retention in the composition, i.e., hydrogen and/or decationized form. Calcining can be performed in air or an inert atmosphere.

The crystalline titanium silicates also can be washed, typically with water, and then dried at an effective drying temperature, which typically ranges from about 150° F. to about 600° F., before calcining.

IV. Titanium silicate Molecular Sieves: Form and Particle Size

Titanium silicate molecular sieves prepared in accordance with the invention are formed in a wide variety of particle sizes. Generally, the particles can be a powder, a granule, or a molded product, such as an extrudate. The titanium silicate molecular sieves can be size classified using a screen. Typically, as formed, titanium silicate molecular sieves of the present invention have a particle size sufficient to pass through a 2 mesh (Tyler) screen and be maintained on a 400 mesh (Tyler) screen, particularly where the molecular sieve is molded, such as by extrusion. The titanium silicate can be extruded before drying or dried or partially dried and then extruded.

V. Compositions Comprising Titanium Silicate Molecular Sieves

Titanium silicate molecular sieves of the present invention can be used without being formulated with other materials. Alternatively, titanium silicate molecular sieves of the present invention can be used to form compositions suitable for desired applications. For example, titanium silicate molecular sieves of the present invention can be combined with another material, or materials, resistant to the temperatures and other conditions employed in particular processes. Such materials include active and inactive materials, synthetic and naturally occurring titanium silicate molecular sieves, as well as inorganic materials, such as clays, silica and/or metal oxides. Active materials also can be used in conjunction with the titanium silicate molecular sieves of the present invention to, for example, improve the conversion and/or selectivity of the molecular sieves. Inactive materials suitably serve as diluents to control the amount of conversion in a given process so that products can be obtained economically and in an orderly manner without employing other means for controlling the reaction rate.

Titanium silicate molecular sieves of the present invention also can be incorporated into naturally occurring clays, e.g., bentonite and kaolin, to improve certain physical properties, such as crush strength, of the catalyst under commercial operating conditions. Examples of naturally occurring clays that can be used to form compositions comprising titanium silicate molecular sieves of the present invention include the montmorillonite and kaolin families, which include the sub-bentonites and the kaolins commonly known as Dixie, McNamee, Georgia and Florida, or others in which the main constituent is halloysite, kaolinite, dickite, nacrite or anauxite. Such clays can be used with or without calcination, acid treatment and/or chemical modification.

Titanium silicate molecular sieves of the present invention also may be composited with a porous matrix material. Exemplary porous matrix materials include silica-alumina, silica-magnesia, silica-zirconia, silica-thoria, silica-berylia, silica-titania, as well as ternary compositions, such as silica-alumina-thoria, silica-alumina-zirconia, silica-alumina-magnesia and silica-magnesia-zirconia. The relative proportions of titanium silicate molecular sieves of the present invention and other materials can vary widely with the crystalline organosilicate content ranging from greater than about 1 percent to 100 percent by weight, typically from greater than 1 percent to at least 90 percent by weight, and more typically from about 2 to about 50 percent by weight of the composite.

Additional information concerning compositions useful for adsorption separations processes can be found in patents and published applications, including U.S. Pat. No. 6,692,626, application Ser. No. 10/041,536, entitled "Adsorbent Coating Compositions, Laminates and Adsorber Elements Comprising such Compositions and Methods for their Manufacture and Use," and international application No. PCT/US2004/032067, entitled "High Density Adsorbent Structures," each of which is incorporated herein by reference.

VI. Adsorbent Beds and Adsorbers Comprising Disclosed Titanium Silicate Molecular Sieves One primary, use for the present titanium silicate molecular sieves is adsorptive fluid separation processes. The titanium silicate molecular sieves can be used as packed beds, or can be used to make adsorbers or adsorber elements. Exemplary adsorbers and adsorber elements are disclosed in patents and published applications referred to herein. For example, certain embodiments of the present invention are designed for use with pressure swing adsorption separation processes. These processes can be practiced using packed beds of disclosed titanium silicate molecular sieves, both alone and in combination, generally as separate layers or regions, with other inert and/or active materials.

Particular applications concern rotary pressure swing adsorption applications. For these applications, present titanium silicate molecular sieves may be used to form adsorbent sheets, such as disclosed in cited patent documents that are incorporated herein by reference.

Without being bound by theory, the molecular sieves of the invention are believed to differ from prior art zorite compositions in that the former comprise halide anions other than fluorine in their structure. Zorite-type materials have 8-membered rings that connect to form linear channels through the crystalline structure. Titanium atom chains are provided down the length of these channels. The chains have terminal groups that protrude into the channels. In conventional zorite materials, these Ti atoms terminate with —OH (hydroxyl) groups. However, for molecular sieves of the present invention, it is speculated that the OH groups are at least partially substituted by Cl or other non-fluorine halogens. These halogens are larger in diameter than the hydroxyl and F groups and will thus effectively reduce the pore size by providing a barrier to diffusion of gas molecules into the pores and channels. The greater the amount of halogens present in the material, the smaller the effective pore and the higher the barrier to adsorption. It is further believed that the type and quantity of halogens determines the effective pore size while the type and quantity of cation determines the thermal stability and gas capacity of the molecular sieves of the invention.

Prior art zorite materials on the other hand typically do not contain any halogens in their structure. Certain materials had been prepared using fluorine-containing reactants (e.g. KF) and fluorine may have been incorporated into the material. However, fluorine is rapidly removed by conventional cation exchange processing and thus even fluorine is not typically retained in prior art zorite materials. It is noteworthy that past x-ray crystallography studies have solved the structures of prior art zorite-related molecular sieves and none indicates the presence of halide in the molecular sieve. Further, chemical analysis associated with the crystallographic studies of ETS-4 indicated that no halides were present and that seemingly equivalent samples of ETS-4 could be made using synthesis mixtures which either contained halides or didn't contain halides (e.g. synthesis involving $TiCl_3$ versus TiOSO4). See, for instance, the aforementioned U.S. Pat. No. 5,989,316.

VII. EXAMPLES

The following examples are provided to exemplify particular features of the present invention. A person of ordinary skill in the art will appreciate that the scope of the present invention is not limited to the particular features exemplified by these examples.

Various reduced-pore zorite (RPZ), titanium silicate molecular sieve adsorbent samples were prepared in accordance with the invention. Several physical characteristics were measured and their ability to separate certain gas mixtures was determined. For comparative purposes, prior art ETS-4 type adsorbent materials were also prepared and analyzed in a like manner. Table 3 summarizes some of the key process parameters used to prepare the samples, along with the characteristics and properties of the prepared samples.

In Table 3, Samples are listed in chronological order of characterization. Samples C1 and C2-7 are comparative, prior art, ETS-type materials. The other Samples are materials of the present invention. Ba-exchanged samples referred to in applicants' prior provisional application No. 60/817,536, namely Ba-RPZ(a), Ba-RPZ(b), Ba-RPZ(c), Ba-RPZ(d), have been renamed here as Samples 1, 3, 2, and 4 respectively.

A. Preparation

In all cases, samples were prepared using reagents and procedures similar to those listed in Table 2, which shows the specific details for the preparation of Sample 1. For all the Samples, a crystalline material of the form $nM_1O:TiO_2:ySiO_2:zH_2O:wX$ was initially prepared. In most but not all cases, the material was then subjected to an ion exchange reaction such that a certain amount of Ba was exchanged for cations $M_1$ in the precursor materials.

Sample 1 was prepared in the following manner. 25.1 grams of sodium silicate, 4.6 grams of sodium hydroxide, 3.0 grams of KCl and 16.3 grams of $TiCl_3$ solution were combined and processed in an autogenous pressure autoclave for 48 hours at 200° C. to produce a crystalline precursor molecular sieve material. The crystalline precursor material was washed and dried. An ion exchange reaction was then conducted by providing an aqueous mixture comprising 10 grams of precursor molecular sieve material, 20 grams of $BaCl_2$, and 40 grams of water for a period of time without stirring. The aqueous mixture was then heated at 200° C. to form the barium exchanged titanium silicate molecular sieve Sample 1.

TABLE 2

| Reagent | Amount |
|---|---|
| Sample 1 pre-ion exchange | |
| Sodium Silicate | 25.1 grams |
| Sodium Hydroxide | 4.6 grams |
| KF | — |
| KCl | 3.0 grams |
| KI | — |
| $TiCl_3$ | 16.3 grams |
| Temperature-Time | 200° C./48 hours |
| Sample 1 | |
| Ion-Exchange | 10 grams Sample 1 pre-ion exchange, 20 grams $BaCl_2$, and 40 grams $H_2O$ @ 200° C. |

Table 3 below provides, inter alfa, additional samples, production conditions, composition, etc.

TABLE 3

| Table Sample ID | Halide salt additive | Ion Exchange agent | Parent sample | Exchange Temp (° C.) | Exchange time | Ion Exchange pH | Stirring during exchange? |
|---|---|---|---|---|---|---|---|
| C1 | KF | $BaCl_2$ | | 200 | Not controlled (NC) | NC | No |
| 1 | KCl | $BaCl_2$ | | 200 | NC | NC | N |
| 2 | KCl | $BaCl_2$ 5/10/40 g (sample/$BaCl_2$/$H_2O$) | | 100 | NC | NC | N |
| 3 | KCl | $BaCl_2$ 5/10/40 g (sample/$BaCl_2$/$H_2O$) | | 100 | NC | NC | N |
| 4 | KI | $BaCl_2$ 5/10/40 g (sample/$BaCl_2$/$H_2O$) | | 100 | NC | NC | N |
| C2 | KF | None | — | — | — | — | NA |
| C3 | | $BaCl_2$ | C2 | | 2 hrs | NC | N |
| C4 | | $BaCl_2$ | C2 | | 4 hrs | NC | N |
| C5 | | $BaCl_2$ | C2 | 100 | 8 hrs | NC | N |
| C6 | | $BaCl_2$ | C2 | 100 | 16 hrs | NC | N |
| C7 | | $BaCl_2$ | C2 | 100 | 24 hrs | NC | N |
| 5 | KCl | none | — | — | — | — | NA |
| 6 | | $BaCl_2$ | 5 | 100 | 2 hrs | NC | N |
| 7 | | $BaCl_2$ | 5 | 100 | 4 hrs | NC | N |
| 8 | | $BaCl_2$ | 5 | 100 | 8 hrs | NC | N |
| 9 | | $BaCl_2$ | 5 | 100 | 16 hrs | NC | N |
| 10 | | $BaCl_2$ | 5 | 100 | 24 hrs | NC | N |
| 11 | | 21 mole eq $BaCl_2$ | 5 | 100 | 8 hrs | NC | Y |
| 12 | | 7 mole eq $BaCl_2$ | 5 | 100 | 8 hrs | NC | Y |
| 13 | | 21 mole eq $BaCl_2$ | 5 | ambient | 8 hrs | NC | Y |
| 14 | | 7 mole eq $BaCl_2$ | 5 | ambient | 8 hrs | NC | Y |
| 15 | | $BaCl_2$ | 5 | 100 | 72 hrs | NC | N |
| 16 | | $BaCl_2$ | C2 | 100 | 72 hrs | NC | N |
| 17 | | $BaCl_2$ | 5 | 100 | 1 week | NC | N |
| 18 | | $BaCl_2$ | C2 | 100 | 1 week | NC | N |
| 19 | | $BaCl_2$ | 5 | 100 | 10 days | NC | N |
| 20 | | $BaCl_2$ | C2 | 100 | 10 days | NC | N |
| 21 | KCl | none | — | — | — | — | NA |
| 22 | | $BaCl_2$ | 21 | ambient | 8 hrs | pH 8 | Yes |
| 23 | | $BaCl_2$ | 21 | ambient | 8 hrs | pH 13 | Y |
| 24 | | $BaCl_2$ | 21 | 100 | 24 hrs | NC | Y |
| 25 | | $BaCl_2$ | C2 | ambient | 8 hrs | pH 7 | Y |
| 26 | | $BaCl_2$ | C2 | 200 | 16 hrs | NC | N |
| 27 | | $BaCl_2$ | 21 | 200 | 16 hrs | NC | N |
| 28 | KI | none | — | — | — | — | — |
| 29 | KI | none | — | — | — | — | — |
| 30 | KI | none | — | — | — | — | — |

TABLE 3-continued

| Table Sample ID | As-synth. XRD data | Composition (byEDX/EMP) | Gas excluded | GC plots obtained |
|---|---|---|---|---|
| C1 | Yes | Not available | | |
| 1 | Y | 1.09Ba 0.1Na 0.05K 2.46SiO$_2$ 1TiO$_2$ 0.07Cl | CH$_4$ | methane/air |
| 2 | No | 0.97Ba 0.13Na 0.07K 2.4SiO$_2$ 1TiO$_2$ 0.01Cl | CH$_4$ | methane/air |
| 3 | N | 1.09Ba 0.19Na 0.05K 2.44SiO$_2$ 1TiO$_2$ 0Cl | CH$_4$ | methane/air |
| 4 | Y | Not available | | |
| C2 | Y | 1.12Na 0.41K 2.22SiO$_2$ 1TiO$_2$ 0.03Cl 0.32F | | none |
| C3 | | 0.86Ba 0.25Na 0.13K 2.28SiO$_2$ 1TiO$_2$ 0Cl | CH$_4$ | air; CH$_4$; air/CH$_4$; Ar; O$_2$; Ar/O$_2$; |
| C4 | | 0.92Ba 0.17Na 0.09K 2.28SiO$_2$ 1TiO$_2$ 0Cl | CH$_4$ | air; CH$_4$; air/CH$_4$; Ar; O$_2$; Ar/O$_2$; |
| C5 | | 0.96Ba 0.17Na 0.07K 2.39SiO$_2$ 1TiO$_2$ 0Cl | CH$_4$ | air; CH$_4$; air/CH$_4$; Ar; O$_2$; Ar/O$_2$; |
| C6 | | 0.94Ba 0.14Na 0.07K 2.32SiO$_2$ 1TiO$_2$ 0Cl | CH$_4$ | air; CH$_4$; air/CH$_4$; Ar; O$_2$; Ar/O$_2$; |
| C7 | | 0.96Ba 0.15Na 0.06K 2.33SiO$_2$ 1TiO$_2$ 0Cl | CH$_4$ | air; CH$_4$; air/CH$_4$; Ar; O$_2$; Ar/O$_2$; |
| 5 | Y | 0Ba 1.55Na 0.45K 2.68SiO$_2$ 1TiO$_2$ 0.09Cl | | none |
| 6 | | 0.68Ba 0.88Na 0.22K 2.9SiO$_2$ 1TiO$_2$ 0.02Cl | O$_2$ | air; CH$_4$; air/CH$_4$; Ar; O$_2$; Ar/O$_2$; |
| 7 | | 0.85Ba 0.59Na 0.18K 2.71SiO$_2$ 1TiO$_2$ 0.02Cl | O$_2$ | air; CH$_4$; air/CH$_4$; Ar; O$_2$; Ar/O$_2$; |
| 8 | | 1.1Ba 0.43Na 0.11K 2.86SiO$_2$ 1TiO$_2$ 0.02Cl | Ar | air; CH$_4$; air/CH$_4$; Ar; O$_2$; Ar/O$_2$; |
| 9 | | 1.13Ba 0.39Na 0.1K 2.91SiO$_2$ 1TiO$_2$ 0.01Cl | Ar | air; CH$_4$; air/CH$_4$; Ar; O$_2$; Ar/O$_2$; |
| 10 | | 1.21Ba 0.38Na 0.08K 3.02SiO$_2$ 1TiO$_2$ 0.02Cl | CH$_4$ | air; CH$_4$; air/CH$_4$; Ar; O$_2$; Ar/O$_2$; |
| 11 | | 1.17Ba 0.27Na 0.08K 2.7SiO$_2$ 1TiO$_2$ 0.01Cl | CH$_4$ | Air; CH4/O$_2$; Ar/O$_2$; Ar; CH$_4$ |
| 12 | | 1Ba 0.45Na 0.14K 2.85SiO$_2$ 1TiO$_2$ 0.004Cl | CH$_4$ | Air; CH$_4$/O$_2$; Ar/O$_2$; Ar; CH$_4$ |
| 13 | | 0.28Ba 1.02Na 0.37K 2.67SiO$_2$ 1TiO$_2$ 0.02Cl | Ar | Air; CH$_4$/O$_2$; Ar/O$_2$; Ar; CH$_4$ |
| 14 | | 0.26Ba 1.06Na 0.38K 2.79SiO$_2$ 1TiO$_2$ 0.02Cl | Ar | Air; CH$_4$/O$_2$; Ar/O$_2$; Ar; CH$_4$ |
| 15 | | 1.25Ba 0.36Na 0.08K 2.99SiO$_2$ 1TiO$_2$ 0.03Cl | | none |
| 16 | | 0.99Ba 0.17Na 0.08K 2.45SiO2 1TiO2 0.01Cl | | none |
| 17 | | 1.31Ba 0.43Na 0.08K 3.3SiO$_2$ 1TiO$_2$ 0.04Cl | | none |
| 18 | | 0.96Ba 0.18Na 0.08K 2.48SiO$_2$ 1TiO$_2$ 0.02Cl | | none |
| 19 | | 1.26Ba 0.36Na 0.08K 3.08SiO2 1TiO2 0.04Cl | | none |
| 20 | | 0.93Ba 0.19Na 0.08K 2.44SiO$_2$ 1TiO$_2$ 0.02Cl | | none |
| 21 | Y | 0Ba 1.58Na 0.46K 2.88SiO$_2$ 1TiO$_2$ 0.05Cl | | none |
| 22 | | 0.36Ba 1.15Na 0.36K 3.03SiO$_2$ 1TiO$_2$ 0.04Cl | O$_2$ | air; CH$_4$; Ar/O$_2$; |
| 23 | | 0.36Ba 1.3Na 0.42K 2.92SiO$_2$ 1TiO$_2$ 0.04Cl | Ar | air; CH$_4$; Ar/O$_2$; |
| 24 | | 1.2Ba 0.33Na 0.08K 3.25SiO$_2$ 1TiO$_2$ 0.03Cl | Ar | air; CH$_4$; Ar/O$_2$; |
| 25 | | 0.23Ba 0.86Na 0.37K 2.48SiO$_2$ 1TiO$_2$ 0.03Cl | O$_2$ | air; CH$_4$; Ar/O$_2$; |
| 26 | | 1.11Ba 0.1Na 0.05K 2.53SiO$_2$ 1TiO$_2$ 0.04Cl | | none |
| 27 | | 1.38Ba 0.13Na 0.03K 3.02SiO$_2$ 1TiO$_2$ 0.07Cl | | none |
| 28 | Y | 1.58Na 0.41K 2.84SiO$_2$ 1TiO$_2$ 0.03Cl 0.01I | | none |
| 20 | Y | 1.77Na 0.54K 3.36SiO$_2$ 1TiO$_2$ 0.02Cl 0.004I | | none |
| 30 | Y | 1.44Na 0.59K 2.88SiO$_2$ 1TiO$_2$ 0.03Cl 0.014I | | none |

All of the samples listed in Table 3 were prepared in a similar manner but for the following exceptions. For some samples, a different potassium halide salt (i.e. KCl, KI, or KF) was used in the preparation. The salt employed is indicated in the "Halide salt" column. Sample 4 was prepared using 10.8 grams of KI at 225° C./16 hours. Sample 28 was prepared using 6.68 g KI at 215° C. Sample 29 was prepared using 6.68 g KI and 225° C. Sample 30 was prepared using 10.87 g KI at 215° C.

Also, where indicated for certain samples listed in Table 3, no Ba ion exchange was conducted. Generally, different Ba ion-exchange conditions were employed in the case of the remaining samples, although in all cases the agent used was $BaCl_2$. Where applicable, Table 3 lists if a different concentration of $BaCl_2$ was used, and also lists the temperature, time, and pH of the ion-exchange reaction. Also, in some cases, the ion exchange mixture was stirred during the exchange reaction and this too is indicated in Table 3.

As mentioned above, Samples C1 and C2-7 represent prior art compounds. These compounds were prepared for comparative purposes using the prior art method employing KF, a fluorine-containing halide salt, in the preparation.

B. Characterization

Except where noted, the chemical compositions of all the Samples were determined. This was done using EDX/EMP (energy dispersive X-ray)/(electron microprobe) elemental analysis. All ion-exchanged samples were subsequently washed with copious amounts of water to ensure that they were free of residual salts. Thin wafers of samples were produced using a pelletization apparatus and mounted to conventional SEM sample stubs. Measurements were made typically in 3 different locations at 1000 times magnification. The average value over the 3 locations was determined and this was used to determine the composition reported in Table 3. The fluorine content reported on for comparative Sample C2 was obtained from a similarly prepared, but not the same, sample material. Fluorine is a light element and there is significant error in the indicated fluorine content. None of the other Samples had any detectable fluorine content. The composition of the precursors for Samples 1-4 (i.e. prior to ion exchange) was not determined at the time and thus these precursor Samples were omitted from Table 3.

Where indicated, powder X-ray diffraction patterns were obtained for Samples prior to carrying out any ion exchange in the preparation. Patterns were obtained prior to ion exchange for purposes of direct comparison to patterns of prior art ETS-4 materials which also had not undergone any ion exchange. All XRD analyses discussed herein were collected using Co K-alpha radiation on a Rigaku Geigerflex 2173 XRD unit equipped with a graphite monochromator.

Also, where indicated, inverse gas chromatograms were obtained of the elution of certain gas mixtures through the Samples. Inverse gas chromatography experiments were performed using a Varian 3800 Gas Chromatograph (GC) utilizing the thermal conductivity detector. Test adsorbents were packed into 10" long, 0.25" OD copper columns. The columns were filled with approximately 3.5 grams of sample adsorbent. The adsorbents were activated at 250° C. for 10 hours under a flow of 30 cc/minute helium carrier gas. Pulse injections were performed using 1 mL of argon, oxygen, methane, air, br mixtures thereof. This technique is a useful screening tool for determining separation characteristics and is much faster to perform than isotherm analysis. Single components were run through the column to measure the elution time of each component gas from the column. These individual experiments are then used to assign the order of gas elution in a mixture of two or more gases. In the mixtures provided, a gas or gases that are excluded (not adsorbed) elute more quickly than a gas or gas that is adsorbed. By determining which gases are excluded and which are adsorbed, one can estimate a pore size range for the Sample tested. Three different gas mixtures were employed, including air (nitrogen/oxygen), air/methane, and argon/oxygen.

The size of a gas molecule is generally given by the kinetic diameter of that molecule (or atom) as calculated using a Lennard-Jones potential function. The kinetic diameters of a variety of gas species have been calculated (Hirschfelder, et al. Molecular Theory of Gases and Liquids. Corrected printing with notes added. John Wiley and Sons, End.: New York, 1964; Sircar, et al. Gas Separation by Zeolites. In Handbook of Zeolite Science and Technology, Auerbach, Carrado, Dutta Eds. Marcel Dekker, Inc. New York 2003). The Lennard-Jones model treats a diatomic gas molecule as a soft sphere and interactions between that sphere are assumed to be against a fixed point or charge. For reference, the accepted Lennard-Jones kinetic diameter for oxygen is 0.346 nm, for argon is 0.340 nm, for $N_2$ 0.364 nm, and for methane is 0.380 nm. Breck, D. W., *Zeolite Molecular Sieves: Structure, Chemistry, and Use*, John Wiley & Sons, Inc., New York (1974).

In reality, a diatomic gas molecule is not perfectly spherical and an adsorbent structure is not rigid since the large number of atoms and bonds in the framework randomly vibrate; allowing the structure some flexibility. The combination of a non-spherical gas species interacting with a flexible adsorbent provides a result that is not predicted by the Lennard-Jones theory. In adsorptive fluid separations, the oxygen molecule acts smaller than an argon atom by adsorbing into pores that do not retain any argon. These observations have also been made using carbon molecular sieves. See, for example, Jin, X, et al. *Ind. Eng. Chem. Res.* 45, 5775-5787 (2006), where the authors demonstrate the separation of argon from oxygen by preferentially adsorbing the oxygen in a kinetic PSA cycle. The estimation of the effective pore size of the inventive titanium silicate molecular sieves may be guided by the calculated Lennard-Jones kinetic diameters but, as the Lennard-Jones theory fails to predict the experimental observations, the absolute values of the pore sizes for the adsorbents cannot be accurately assigned using those calculated diameters. By way of comparison, air ($N_2/O_2$) behaves in accordance with Lennard-Jones theory as $O_2$ is more quickly adsorbed on carbon molecular sieves (activated carbons having pores having diameters close to the molecular diameter of $N_2$). This behaviour is exploited for PSA systems that are used to separate $N_2$ from air by preferentially adsorbing $O_2$ during the cycle.

C. Results and Discussion

1. Crystal Structure

Figure 1F:
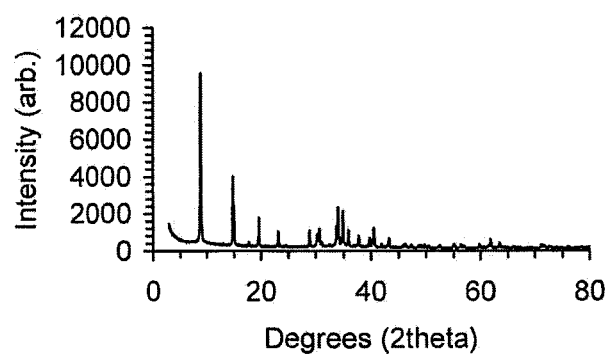
FIG. 1f is a powder XRD pattern for a prior art material designated as comparative Sample C2 in the Examples.
Figure 1G:
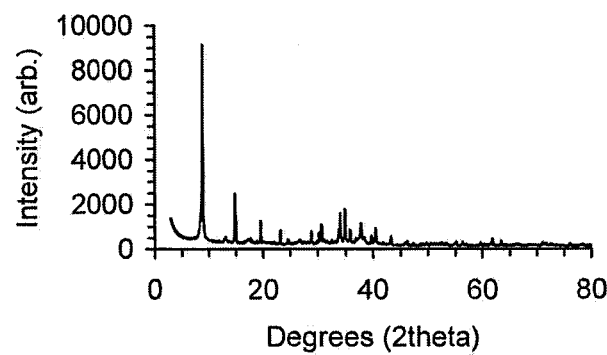
FIG. 1g is a powder XRD pattern for one embodiment of a reduced pore zorite material of the present invention designated as Sample 5 in the Examples.

FIG. 1a depicts the powder XRD pattern of Sample C1, a prior art ETS-4 material which had not undergone any ion exchange (prepared according to the method disclosed in the '939 patent). FIG. 1f also depicts the powder XRD pattern of Sample C2, a prior art material which had not undergone any ion exchange. FIGS. 1b-1e depict the powder XRD patterns obtained prior to any Ba ion exchange being performed on inventive Samples 1, 3, 2, and 4 respectively. Finally, FIG. 1g depicts the pattern of inventive Sample 5 which had not undergone any ion exchange.

The most intense reflection ($I_o$) in the XRD pattern for the ETS-4 material in FIG. 1a occurred at a 2-theta of 14.766° (corresponding to a d-spacing of 6.96 Å). Using the XRD pattern collected for ETS-4 on the Rigaku instrument, the ratio of the intensities of the major reflections can be normalized to the reference peak at 14.766°. The crystal structure for ETS-4 produces an XRD pattern where all peaks are smaller than the $I_o$ peak at 14.766° (or d-spacing of 6.96 Å).

Powder patterns for inventive Samples 1-4 were similarly collected and normalized to the peak at 14.766°. Each of these compounds includes at least one, and typically plural, XRD peaks that are larger than the reference peak used in ETS-4 to describe compounds within the '939 patent. Two peaks in the Sample 1 and Sample 4 titanium silicate molecular sieves are more intense than the benchmark reflection.

However, subsequent analysis of prior art and inventive molecular sieves show that it is difficult to distinguish the two on the basis of XRD patterns. For instance, FIG. 1f shows the pattern of prior art material (namely Sample C2) and FIG. 1g shows the pattern of inventive material (namely Sample 5). Both show relatively similar peak ratios relative to the benchmark reflection. It is speculated that the apparent difference in peak ratios observed in Samples 1-4 may have been due to differences in the preparation of the samples prior to analysis.

The crystal structure of the molecular sieves of the invention has substantially similar lattice spacings as zorite. But while XRD analysis may not readily distinguish these materials, clearly they differ in composition and in gas separation characteristics.

2. Composition

As is evident from the composition data in Table 3, all comparative samples prepared in accordance with the prior art either had fluorine anion content or had no halide anion content. On the other hand, all the samples of the invention had significant halide content other than fluorine (being either chlorine or iodine). Halide content as represented by the variable w was typically between about 0.01 and 1. The presence of measurable quantities of halide in the inventive molecular sieves, both pre- and post-ion exchange, strongly indicates that the halide is a functional part of the framework.

Looking at the comparative Samples C2-C7, it appears that fluorine is rapidly and essentially completely removed from these prior art molecular sieves during ion exchange. However, inventive Samples 5-10 retain halide anion content under similar ion exchange conditions. The presence of larger Cl anions in the inventive samples may impede diffusion into the framework of the sieves and hence may influence both the effective pore size measured by GC analysis (below) and the rate at which the ion-exchange reactions take place.

Based on the observed results for Samples 11-14, temperature plays a significant role in the extent of Ba exchange but not necessarily in anion exchange. However, ion exchange reactant concentration did not seem to play such a significant role. It appears that the amount of anion and cation in the materials can be independently controlled by controlling the exchange conditions.

Also as can be seen from Table 3, inventive Samples 16, 18, 20, 25, and 26 were all prepared from comparative material C2 by ion exchanging for very long periods of time (8 hours and up) with $BaCl_2$. These samples illustrate that Cl can be introduced into prior art materials with sufficient (greater than prior art) exchange conditions. Unlike prior art, Ba-exchanged materials, these Samples unexpectedly contained significant Cl content.

3. Gas Separation

For each Sample, those gases and/or gas mixtures for which inverse gas chromatograms were obtained are listed in Table 3. Also, Table 3 indicates the smallest gas in the mixtures tested that was excluded by each Sample adsorbent. Oxygen is "smaller" than argon with respect to adsorption in the pores of the Samples during this testing, notwithstanding the fact that argon has a kinetic diameter that is smaller than oxygen.

Figure 2A:
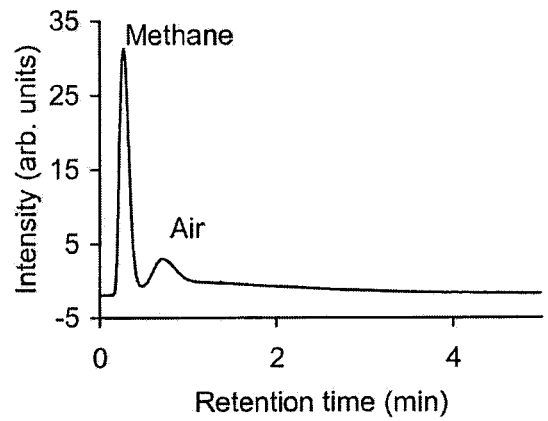
FIG. 2a is a gas chromatogram of the elution of a methane-air mixture through comparative Sample C1 in the Examples.
Figure 2B:
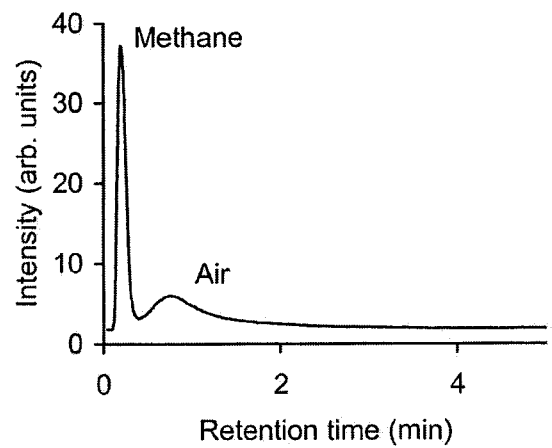
FIG. 2b is a gas chromatogram of the elution of a methane-air mixture through Sample 1 in the Examples.
Figure 2C:
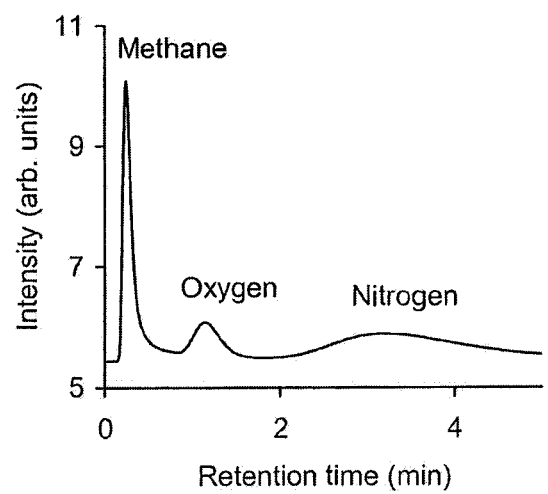
FIG. 2c is a gas chromatogram of the elution of a methane-air mixture through Sample 3 in the Examples.
Figure 2D:
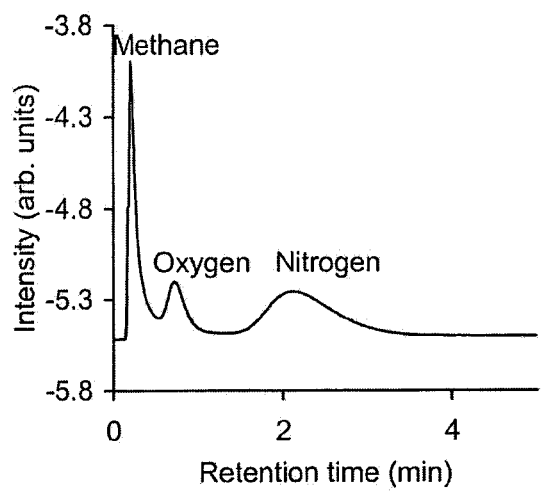
FIG. 2d is a gas chromatogram of the elution of a methane-air mixture through Sample 2 in the Examples.
Figure 2E:
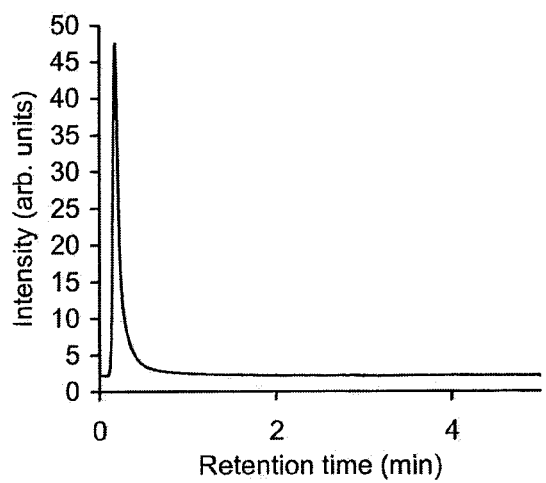
FIG. 2e is a gas chromatogram of the elution of air through Sample 4 in the Examples where the single peak shows no separation of nitrogen, oxygen or argon.

FIG. 2a is a gas chromatogram of the elution of a methane-air mixture through comparative Sample C1 in the Examples illustrating separation of methane and air using the molecular sieve. FIGS. 2b-2d are gas chromatograms of the elution of a methane-air mixture through Samples 1, 3 and 2 respectively in the Examples illustrating separation of the mixture into three separate fluid streams enriched in methane, oxygen and nitrogen. FIG. 2e is a gas chromatogram of the elution of air through Sample 4 in the Examples where the single peak shows no separation of nitrogen, oxygen or argon.

FIGS. 2k-2o are gas chromatograms of the elution of a methane-air mixture illustrating the effect of ion exchange time on the inventive starting material of Sample 5 (the exchanged series being Samples 6-10). These can be compared to FIGS. 2f-2j, which illustrate the effect of similar ion exchange times on the comparative starting material of Sample C2 (the ion exchanged series being Samples C3-C7). FIGS. 2u-2y are gas chromatograms of the elution of an argon-oxygen mixture illustrating the effect of ion exchange time on the inventive starting material of Sample 5 (again, the exchanged series being Samples 6-10). These can be compared to FIGS. 2p-2t, which illustrate the effect of similar ion exchange times on the comparative starting material of Sample C2 (again, the ion exchanged series being Samples C3-C7).

For example, FIGS. 2k-2o and 2u-2y for the inventive series Samples 6-10 show that initially both argon and oxygen are excluded. But, with longer ion exchange times, oxygen begins to penetrate the adsorbent, indicating that the pore size is increasing. On the other hand, FIGS. 2f-2j and 2p-2t for the Comparative series C2-C7 show that initially only methane is excluded and that there is no apparent change with ion exchange time. The preceding data suggests that pore size may be controlled by anion content and that gas capacity (i.e. retention time) is controlled by Ba cation content. For instance, prior art Samples C2 to C7 demonstrate that the retention time increases with increasing Ba content but the pore size does not change otherwise as a function of exchange. At equivalent barium levels, samples containing chlorine will have smaller pores than samples which do not contain chlorine.

Figure 2Z:
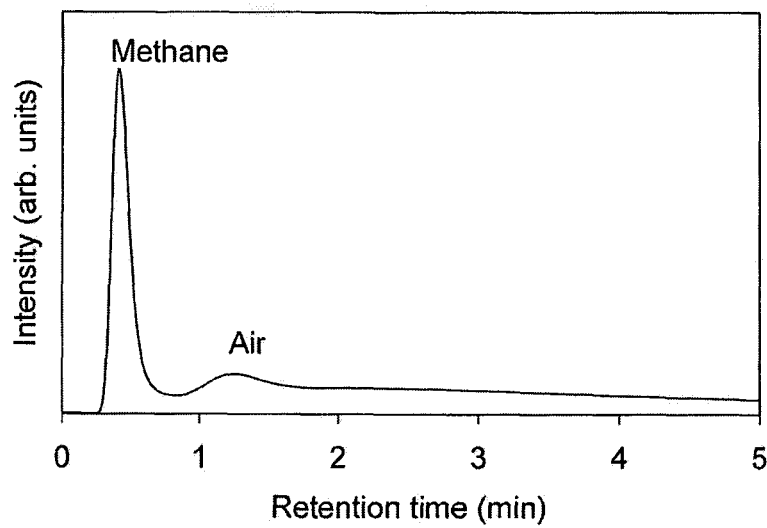
Figure 2A:
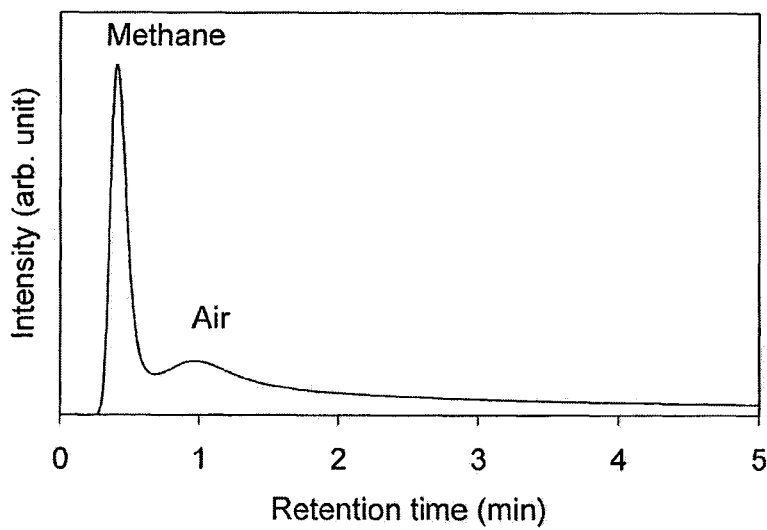
Figure 2A:
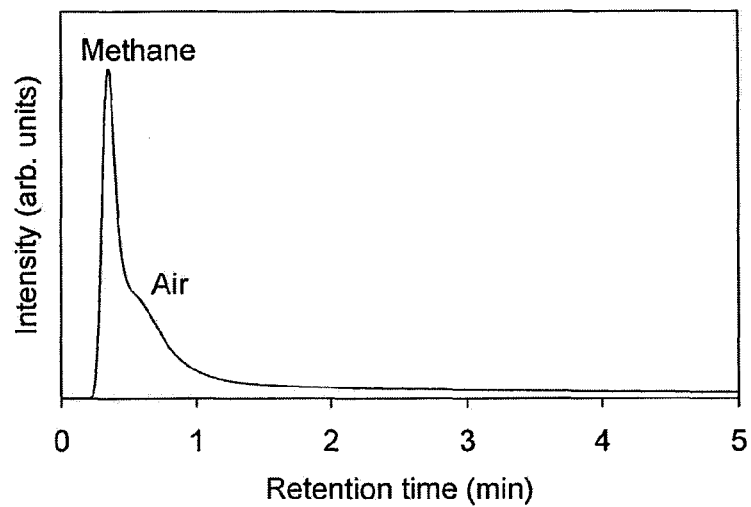
Figure 2A:
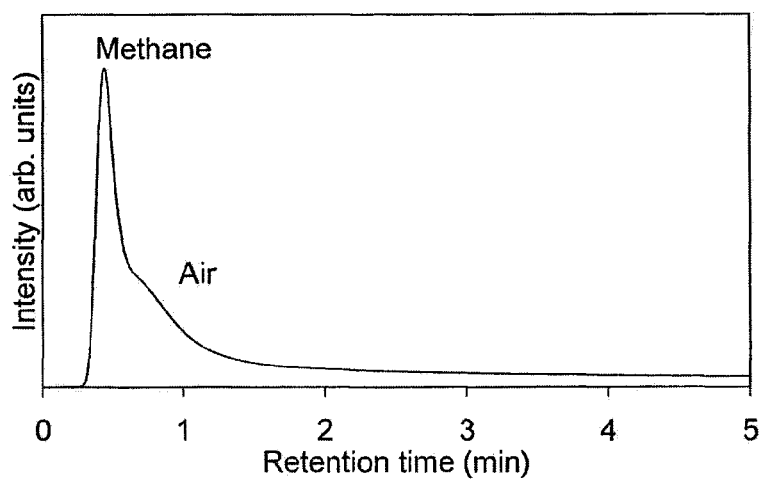
Figure 2A:
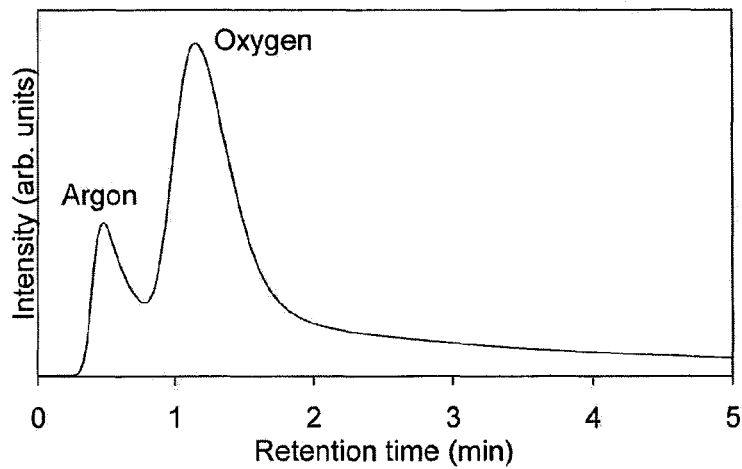
Figure 2A:
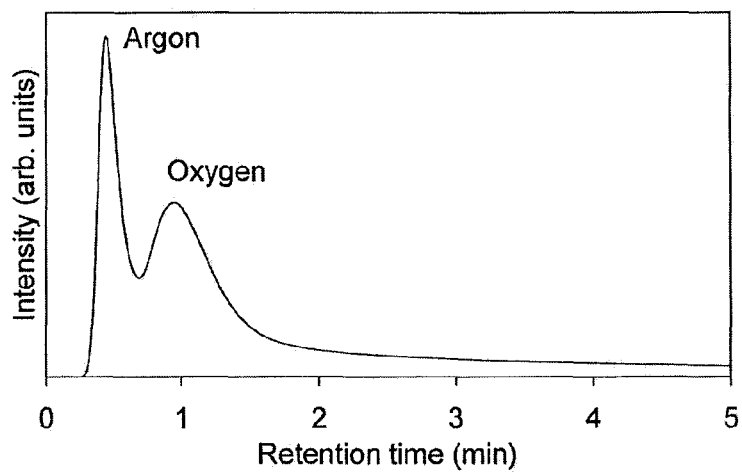
Figure 2A:
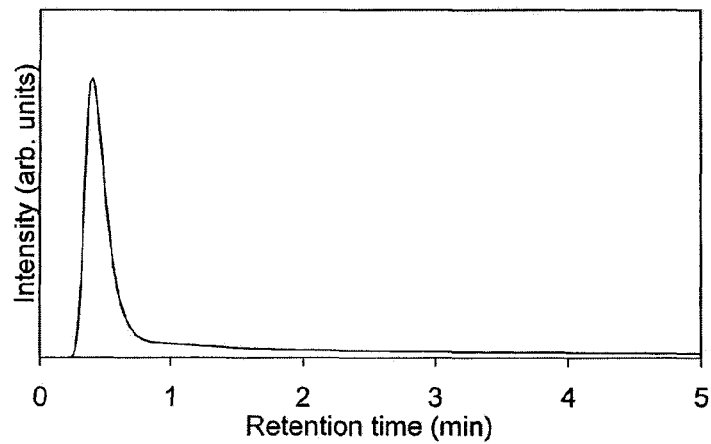
Figure 2A:
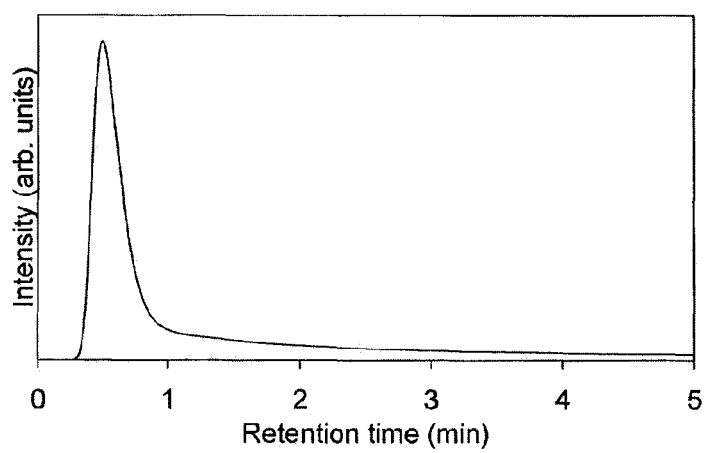
Figure 2A:
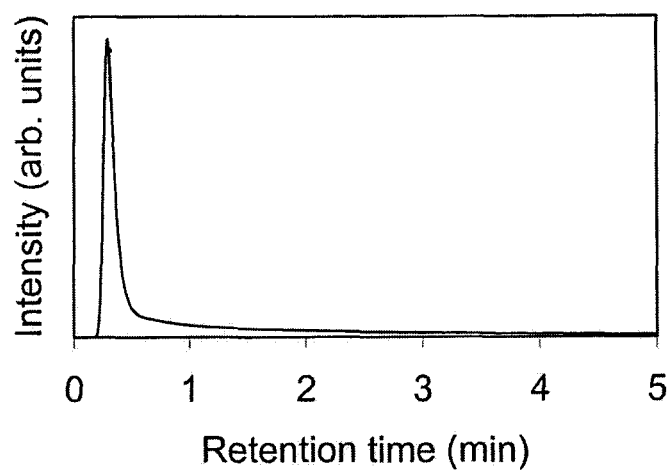
Figure 2A:
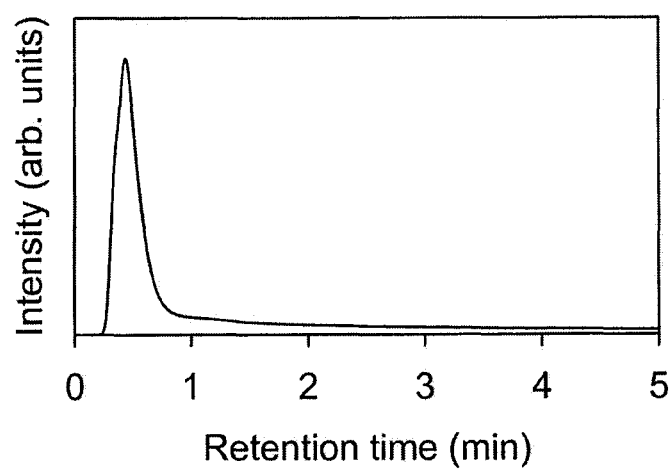

FIGS. 2z-2ac pertain to elution of a methane-air mixture through inventive Samples 11-14. FIGS. 2ad-2ag pertain to elution of an argon-oxygen mixture through inventive Samples 11-14. These Figures show the effect of $BaCl_2$ concentration and temperature during the ion exchange reaction. The higher temperature leads to a greater amount of ion exchange, which in turn results in increased pore size. $BaCl_2$ concentration has less effect. These Figures show that only methane is excluded in Samples 11 and 12, while Samples 13 and 14 exclude argon.

FIGS. 2ah-2ai pertain to elution of an argon-oxygen mixture through inventive Samples 22-23 and illustrate the effect of pH during the ion exchange reaction. The comparable stoichiometry of these two materials indicates that pH may not be significant for either anion or cation exchange at low exchange temperatures. At longer times or higher temperatures, the pH may have more of a directing influence on the material characteristics.

Figure 3A:
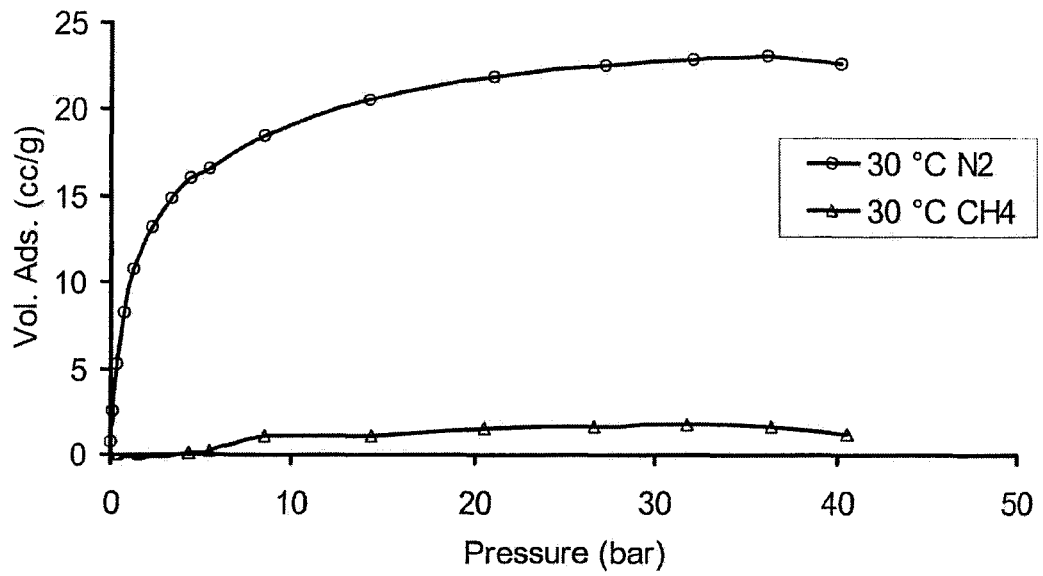
FIG. 3a shows isotherm data for Sample 1 pre-ion exchange.
Figure 3B:
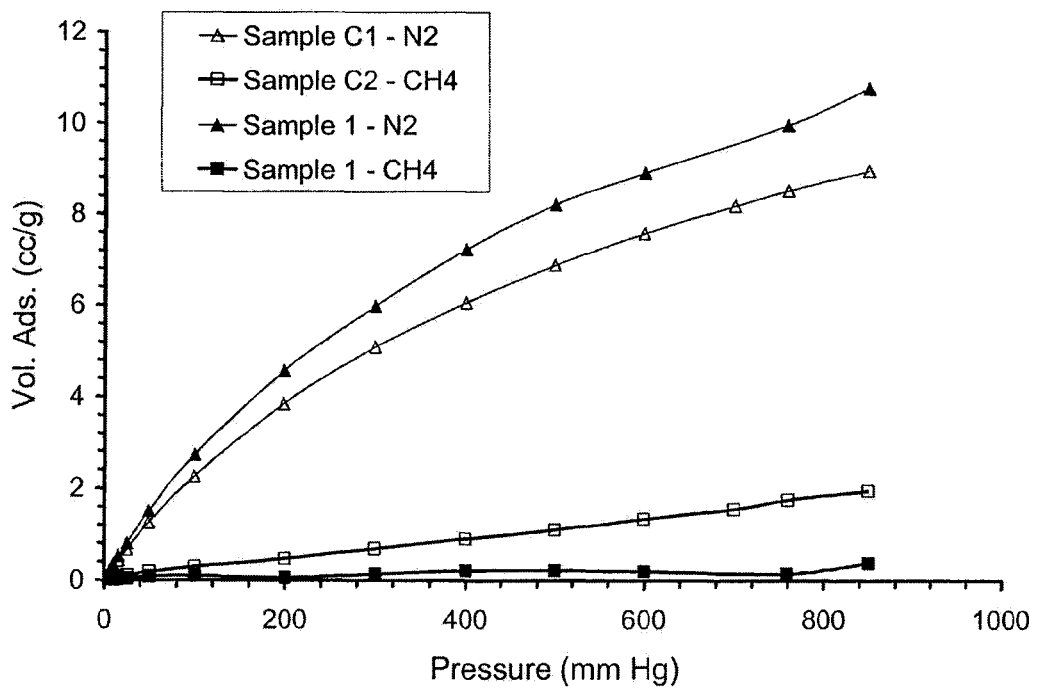
FIG. 3b compares isotherm data for Sample C1 to that of Sample 1.

FIG. 3a shows isotherm data for Sample 1 pre-ion exchange. FIG. 3b compares isotherm data for Sample C1 to that of Sample 1. The isotherm data shown in these Figures indicates that prepared adsorbents can completely exclude methane even up to very high partial pressures. The prior art material, Sample C1, does not exclude methane as effectively as the inventive material, Sample 1. Further, the isotherm data corroborates the conclusions drawn by the GC chromatograph technique. The GC technique may not be sensitive enough to discern minor differences between samples. The isotherms are more sensitive and can substantiate differences between materials that the GC technique does not.)

The present application has been described with reference to examples of preferred embodiments. It will be apparent to those of ordinary skill in the art that changes and modifications may be made without departing from this invention.

We claim:

1. A crystalline titanium silicate molecular sieve having a formula representing mole ratios of oxides of $$nM_1O:TiO_2:ySiO_2:zH_2O:wX$$

wherein $M_1$ is at least one metal cation, n is from about 1 to about 2, y is from about 1 to about 10, z is from 0 to about 100, X is a halide anion other than fluorine, or a combination of halide anions excluding fluorine, and w is greater than 0, and wherein the molecular sieve has a crystal structure having substantially similar lattice spacings as zorite.

2. The titanium silicate molecular sieve according to claim 1 wherein w is less than 1.

3. The titanium silicate molecular sieve according to claim 1 wherein w is greater than about 0.01.

4. The titanium silicate molecular sieve according to claim 1 wherein X is Cl.

5. The titanium silicate molecular sieve according to claim 1 wherein z is from about 5 to about 40.

6. The titanium silicate molecular sieve according to claim 1 wherein y is at least 2 and up to about 5.

7. The titanium silicate molecular sieve according to claim 1 wherein $M_1$ consists of metal cations.

8. The titanium silicate molecular sieve according to claim 7 wherein $M_1$ is selected from IUPAC classification Groups 1-3 metals, Group 8-12 metals, alkaline earth metals, rare earth metals, and all combinations thereof.

9. The titanium silicate molecular sieve according to claim 8 wherein $M_1$ comprises barium.

10. The titanium silicate molecular sieve according to claim 9 wherein $M_1$ additionally comprises sodium and potassium.

11. The crystalline titanium silicate molecular sieve according to claim 1 wherein at least one peak of its XRD pattern has an intensity greater than an intensity of a peak at a d-spacing of 6.96 Å.

12. The titanium silicate molecular sieve according to claim 1 having a pore size that ranges from greater than about 2 Å to about 5 Å.

13. The titanium silicate molecular sieve according to claim 1 where in the molecular sieve is substantially free of any fluorine.

14. A process for preparing the titanium silicate molecular sieve according to claim 1, comprising:
providing a source of silicon, a source of titanium, a source of alkalinity, a metal salt, and a halide anion source other than fluorine, to form a composition where the mole ratio of $SiO_2/Ti$ is greater than about 1, $H_2O/SiO_2$ is greater than about 2 and $M_1SiO_2$ is from about 0.1 to about 10; and
processing the composition at a temperature and for a period of time effective to produce the molecular sieve.

15. The process according to claim 14 further comprising performing ion exchange on the titanium silicate molecular sieve to produce an ion-exchanged titanium silicate molecular sieve having a formula representing mole ratios of oxides of $$nM_2O:TiO_2:ySiO_2:zH_2O:wX$$

wherein $M_2$ is at least one metal cation and n is from about 1 to about 2.

16. A process for adjusting the pore size of the titanium silicate molecular sieve according to claim 1 comprising performing ion exchange on the titanium silicate molecular sieve to produce an ion-exchanged titanium silicate molecular sieve having a formula representing mole ratios of oxides of $$nM_2O:TiO_2:ySiO_2:zH_2O:wX$$

wherein $M_2$ is at least one metal cation.

17. A composition, comprising:
a crystalline titanium silicate molecular sieve having a formula representing mole ratios of oxides of $$nM_1O:TiO_2:ySiO_2:zH_2O:wX$$

wherein $M_1$ is at least one metal cation, n is from about 1 to about 2, y is from about 1 to about 10, z is from 0 to about 100, X is a halide anion other than fluorine, or a combination of halide anions excluding fluorine, and w is greater than 0;
wherein the molecular sieve has a crystal structure having substantially similar lattice spacings as zorite, and
from greater than zero weight percent to less than one hundred percent of at least one additional material.

18. An adsorber for use in an adsorption separation process, comprising an adsorbent comprising a titanium silicate molecular sieve having a formula representing mole ratios of oxides of $$nM_1O:TiO_2:ySiO_2:zH_2O:wX$$

where $M_1$ is at least one metal cation, n is from about 1 to about 2, y is from about 1 to about 10, z is from 0 to about 100, X is a halide anion other than fluorine, or a combination of halide anions excluding fluorine, and w is greater than 0, and
wherein the molecular sieve has a crystal structure having substantially similar lattice spacings as zorite.

19. An adsorptive fluid separation process, comprising:
providing a titanium silicate molecular sieve having a formula representing mole ratios of oxides of $$nM_1O:TiO_2:ySiO_2:zH_2O:wX$$

where $M_1$ is at least one metal cation, n is from about 1 to about 2, y is from about 1 to about 10, z is from 0 to about 100, X is a halide anion other than fluorine, or a combination of halide anions excluding fluorine, and w is greater than 0, and wherein the molecular sieve has a crystal structure having substantially similar lattice spacings as zorite; and
contacting the titanium silicate molecular sieve with a feed fluid mixture comprising at least a first component and a second component to produce at least one product fluid enriched in the first component relative to the second component using an adsorption process.

* * * * *